(12) United States Patent
Minamizawa et al.

(10) Patent No.: US 6,427,004 B1
(45) Date of Patent: Jul. 30, 2002

(54) COMMUNICATION APPARATUS

(75) Inventors: Fumihiro Minamizawa, Toyoake; Junji Hatamura, Nagoya, both of (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/259,269

(22) Filed: Mar. 1, 1999

Related U.S. Application Data

(63) Continuation-in-part of application No. 09/086,945, filed on May 29, 1998.

(30) Foreign Application Priority Data

Jun. 4, 1997 (JP) .............................. 9-146843
Mar. 2, 1998 (JP) ........................... 10-049106
Mar. 31, 1998 (JP) ........................... 10-105492

(51) Int. Cl.$^7$ ............................................. H04M 11/00
(52) U.S. Cl. .......................... 379/100.06; 379/100.01; 379/93.17
(58) Field of Search ................... 379/102.01, 100.06, 379/100.01, 93.17, 93.19, 100.16, 100.17, 93.05, 93.09; 345/156, 172; 358/400, 451, 452, 453

(56) References Cited

U.S. PATENT DOCUMENTS

| | | | | |
|---|---|---|---|---|
| 4,811,385 A | * | 3/1989 | Watanabe | 379/100.06 |
| 5,442,687 A | * | 8/1995 | Miller | 379/100.01 |
| 5,680,126 A | * | 10/1997 | Kikinis | 341/22 |
| 5,748,712 A | * | 5/1998 | Nonomura | 379/100.06 |
| 5,768,657 A | * | 6/1998 | Kimura et al. | 399/81 |

FOREIGN PATENT DOCUMENTS

| | | | | |
|---|---|---|---|---|
| JP | 402097160 A | * | 4/1990 | H04M/11/00 |
| JP | 403201857 A | * | 9/1991 | H04M/11/00 |
| JP | A-7-321888 | | 12/1995 | |
| JP | 408130589 A | * | 5/1996 | H04M/11/04 |

* cited by examiner

*Primary Examiner*—Melur Ramakrishnaiah
(74) *Attorney, Agent, or Firm*—Oliff & Berridge PLC

(57) ABSTRACT

When CPU of a communication apparatus judges that a telephone line is not closed-and-connected and also judges that a transmission original is set, CPU performs processing of setting a transmission concentration. If it judges that no transmission original is set, the volume of a ringing sound is set. Further, when CPU judges that the telephone line is connected and closed and also judges that a telephone receiver is not on hook, it performs processing of setting a receiver volume. If it judges that the telephone receiver is on hook, it sets the volume of voices of a communication partner which are output from a speaker.

16 Claims, 18 Drawing Sheets

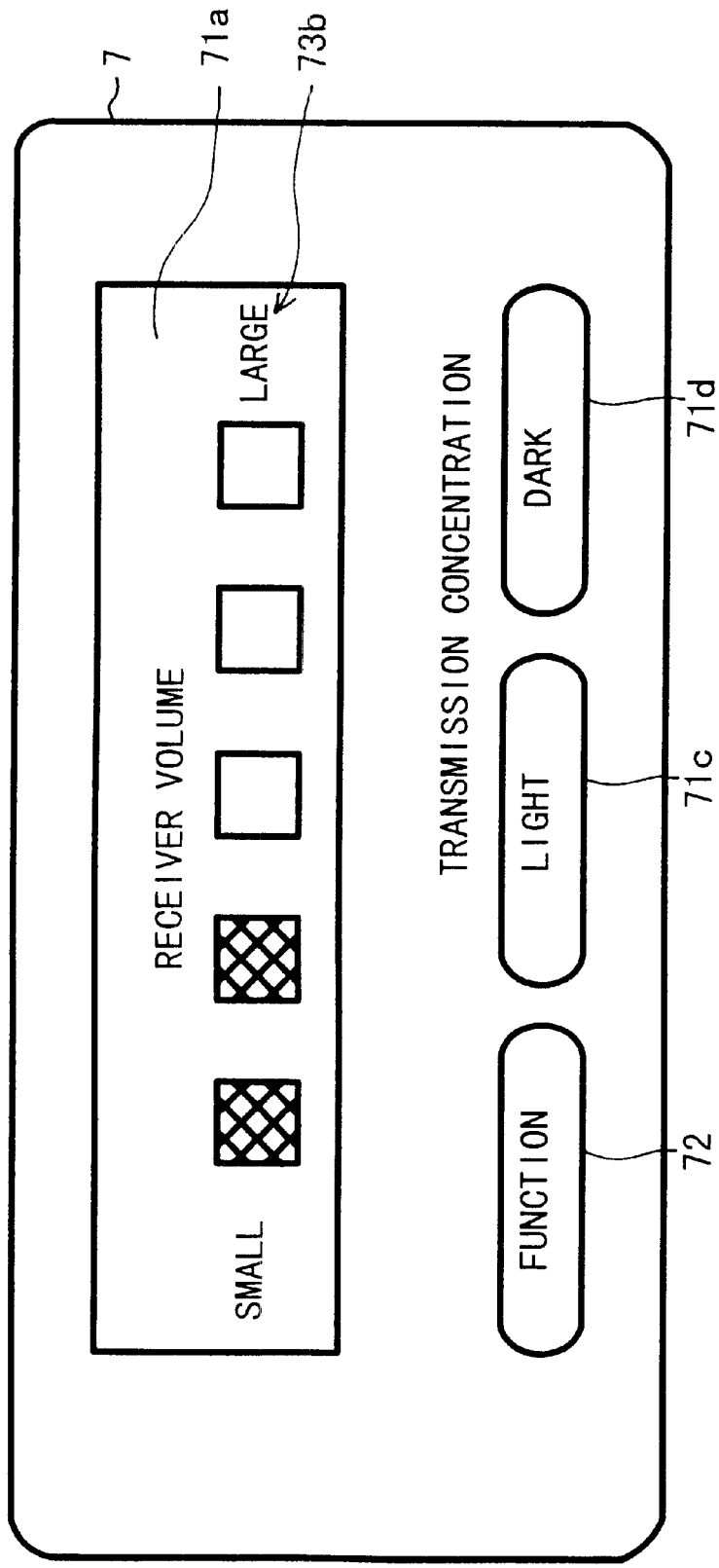

COMMUNICATION APPARATUS

This application is a continuation-in-part of U.S. application Ser. No. 09/086,945, filed May 29, 1998.

BACKGROUND OF THE INVENTION

1. Field of Invention

The invention relates to a communication apparatus such as a facsimile machine, a telephone or the like, and particularly to a structure to improve the operability of setting various functions, such as sound volume, transmission concentration, etc., for example.

2. Description of Related Art

Recently, facsimile machines have been designed in a multifunction style, and various functions such as a copy function, an automatic telephone message recording function, etc. are installed in these facsimile machines. Therefore, these functions can be performed by only one facsimile machine.

In such a facsimile machine, a large number of keys are provided on a front panel thereof to execute each function. If each key is individually provided in association with each function, it increases the cost of the facsimile machine. On the other hand, if each function status is set by key operation in combination with a function key, the cost is reduced because the number of keys is reduced, however, the operability is generally lowered.

Particularly, the sound volume adjustment key of the telephone function is indispensable to enhance the operability (ease of operation) for users. However, this key is not frequently used, and instead it is unnecessary to provide this key as an independent key in consideration of increasing costs, etc. On the other hand, in the case of a sound volume adjustment of a telephone by a key operation in combination with a function key, a user usually needs to carry out the key operation while checking a manual or the like every time, so that the problem arises that the user must perform a cumbersome operation.

In the case of a terminal apparatus having a function of outputting sounds through a speaker, the sound volume adjustment key thereof also has the same problem as the sound volume adjustment key of the telephone function.

In addition to the above facsimile machine, a facsimile machine having an operation panel shown in FIG. 14 is known.

On an operation panel 90 are provided a function switching button 91, a receiver volume setting button 92 comprising a pair of buttons to set a receiver sound volume, a ringing sound volume setting button 93 comprising a pair of buttons to set a ringing sound volume, a speaker volume setting button 94 comprising a pair of buttons to set a speaker sound volume at a handset communication time, and a liquid crystal display 95 for displaying the setting content.

A user of the facsimile machine pushes the function switching button 91 to select a desired function, and operates a desired setting button while viewing a cursor displayed on the liquid crystal display 95 to check the setting status.

Since the above-described facsimile machine is not provided with any button for setting a transmission concentration, in order to set the transmission concentration, the function button 91 is pushed several times to switch the frame of the liquid crystal display 95 to a frame used to set the transmission concentration, and any one of the receiver volume setting button 92, the ringing sound volume setting button 93 and the speaker volume setting button 94 is operated to set the transmission concentration.

That is, a number of button operations are needed to set the transmission concentration, and thus the operability is lowered. In addition, since a button that is specifically dedicated for setting the transmission concentration is not provided on the operation panel, a user may not understand that the transmission concentration can be set.

Further, the receiver volume setting button 92, the ringing sound volume setting button 93 and the speaker volume setting button 94 are provided independently of each other. Thus, a large number of buttons are needed which increases the manufacturing cost.

SUMMARY OF THE INVENTION

Therefore, an object of the invention is to provide a communication apparatus which can enhance the operability of setting functions, and can reduce the manufacturing cost.

In order to attain the above object, a communication apparatus is provided that includes an image information reader that reads image information recorded on a recording medium and a transmitter that transmits image information read by the reader. A setting device commonly sets a reading concentration when the image information is read by the image reader and sets another function of the apparatus.

Accordingly, the setting of the reading concentration (transmission concentration) and the setting of the other functions are performed by a single device. Therefore, it is unnecessary for a user to learn an operation for setting the reading concentration and an operation for setting the other functions, and particularly discriminating these operations from each other, which enhances operability. In addition, since the above setting operations are performed by only a single device, the number of buttons and manufacturing cost can be reduced.

Further, a communication apparatus which can communicate through a handset under a line closed-and-connected status may include a line status identifier that identifies whether the line status is a line closed-and-connected status or not, and a controller that operates a predetermined key as a sound volume adjustment key if it is judged, on the basis of the identification result of the line status identifier, that the line status is the line closed-and-connected status, and operates the predetermined key as another function key when it is judged, on the basis of the identification result of the line status identifier, that the line status is a line non-closed-and-connected status.

In the communication apparatus, when the line status identifier judges that the line status is the line closed-and-connected status, the controller operates the predetermined key as the sound volume adjustment key. On the other hand, when the line status identifier judges that the line status is the line non-closed-and-connected status, the controller operates the predetermined key as another function key. In this case, a user can perform a sound volume adjustment without any cumbersome operation by merely setting the line status to the line closed-and-connected status and then operating the sound volume adjustment key. Further, in the line non-closed-and-connected status, the sound volume adjustment key serves as a function key other than the sound volume adjustment key. Therefore, the same sound volume adjustment key can be effectively used as a key which is associated with multiple functions, so that the number of keys is reduced and the manufacturing cost can be reduced.

BRIEF DESCRIPTION OF THE DRAWINGS

FIG. 3A is a diagram showing a circuit to set a transmission concentration, FIG. 3B is a diagram showing a circuit to adjust a ringing sound volume and a speaker volume, and FIG. 3C is a diagram showing a circuit to adjust a receiver volume;

FIG. 4C is a diagram showing a receiver volume setting frame displayed on the liquid crystal display portion.

DETAILED DESCRIPTION OF THE PREFERRED EMBODIMENTS

Preferred embodiments according to the invention will be described with reference to the accompanying drawings.

In the following embodiments, the invention is applied to a multifunction type communication apparatus having multifunctions, such as a facsimile machine, a telephone, an image scanner, a printer, etc.

Figure 1:
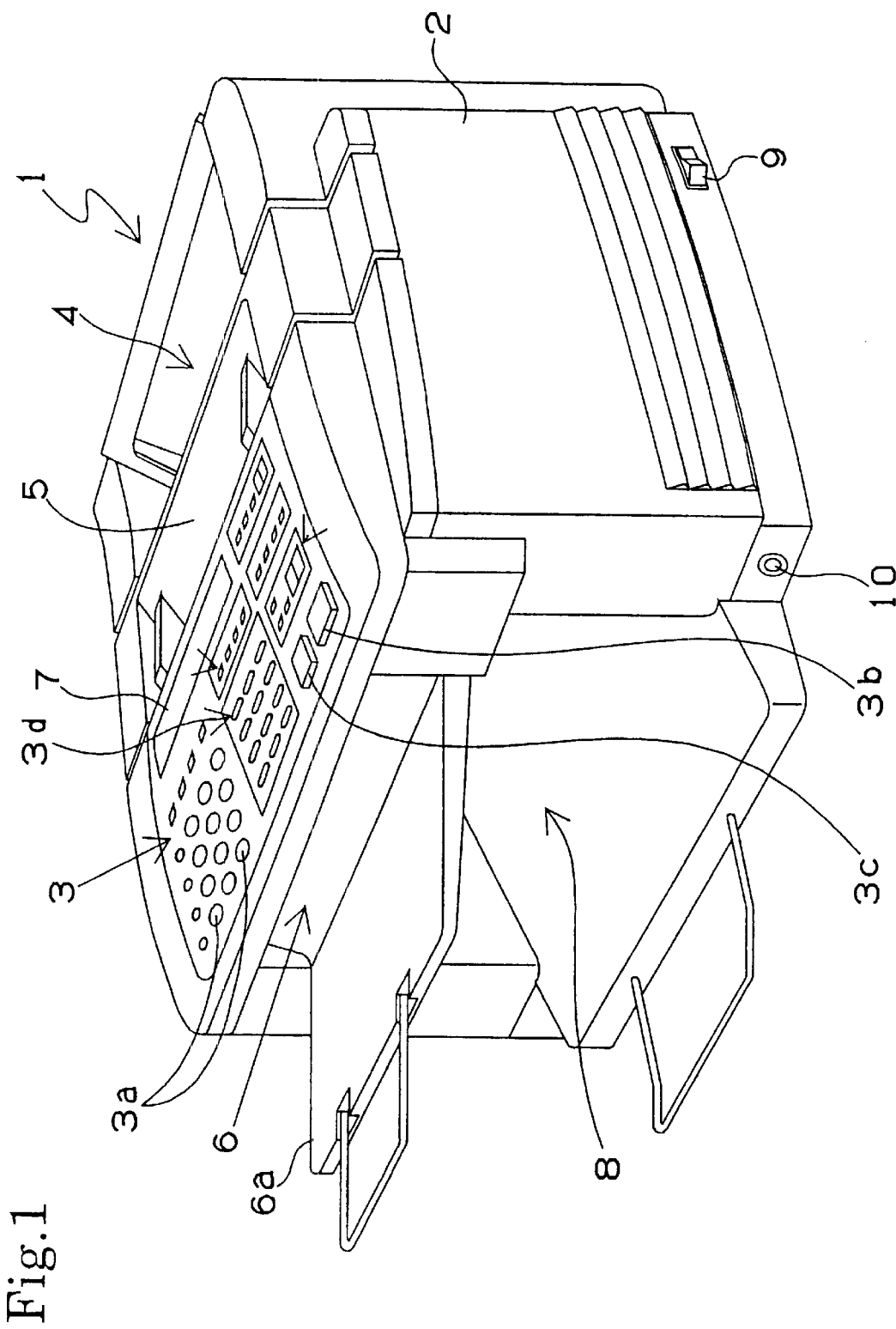
FIG. 1 is a perspective view showing the exterior of a communication apparatus according to an embodiment of the invention.

In FIG. 1, a communication apparatus 1 is provided with a box-shaped housing 2, and an operation panel 3 is provided at the front portion on the top surface of the housing 2. The operation panel 3 is provided with a 10-button keypad 3a which includes numbers of "0" to "9" to input the telephone number or facsimile number of a call destination, the number of copies, etc., a start button 3b to instruct the start of transmission or copy of image information, a stop button 3c to instruct the stop of transmission or copy of image information, and an abbreviated dialing button 3d to invoke an abbreviated telephone number or an abbreviated FAX number.

At the rear portion of the operation panel 3 is provided a liquid crystal display portion (LCD display) 7 (which corresponds to the display of the invention) that sets the reading concentration of an original by an image scanner (represented by reference numeral 37 in FIG. 2), that is, the transmission concentration of the original. The liquid crystal display portion 7 displays the telephone number or FAX number of a call destination and displays operation statuses such as transmission status, reception status, copy status, etc.

Further, at the rear side of the liquid crystal display portion 7 is provided an original set portion 5 that sets a transmission original or a copy original. An original set in the original set portion 5 is fed into the housing 2 by a sheet feeding mechanism (not shown) provided in the housing 2, and an information-recorded portion on the original thus fed is read out by the image scanner. The original from which the information is read out is discharged onto a tray 6a through an original discharge port 6 provided below the operation panel 3 so as to be stacked.

At the rear portion of the original set portion 5 is provided a recording sheet setting portion 4 that enables the setting of a recording sheet on which image information or print data received is recorded. A recording sheet cassette (not shown) that accommodates multiple recording sheets, while the sheets are stacked, is freely detachably secured to the recording sheet setting portion 4. Each of the recording sheets accommodated in the recording sheet cassette is fed into the housing 2 by the sheet feeding mechanism, and the recording sheet thus fed is subjected to a recording operation by a printer (represented by reference numeral 49 in FIG. 2). The recording sheet thus recorded is discharged from a recording sheet discharge portion 8 provided below the tray 6a.

The lower portion of the right-side surface of the housing 2 is provided with a power switch 9 that turns on/off the power of the communication apparatus 1. The right and lower portion of the front surface of the housing 2 is provided with a video input terminal 10 through which video signals are input.

Further, the right side surface of the housing 2 is provided with a telephone receiver (represented by reference numeral 11 in FIG. 2) which enables communications with a communication partner. The back surface of the housing 2 is connected to a telephone line (represented by reference numeral 61 in FIG. 2).

Figure 2:
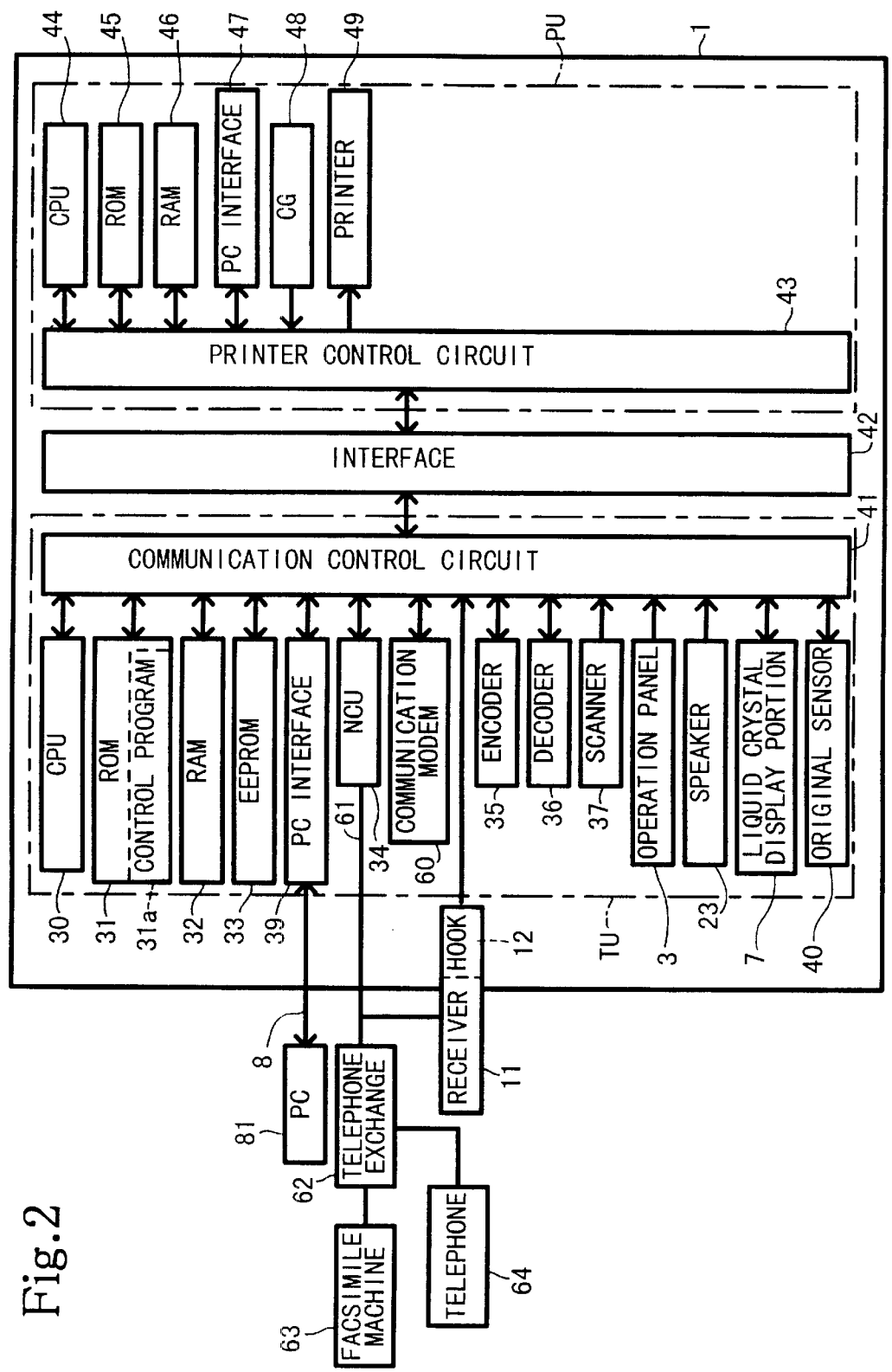
FIG. 2 is a block diagram showing the electrical structure of the communication apparatus shown in FIG. 1.

Next, the main electrical construction of the communication apparatus 1 will be described with reference to FIG. 2.

The communication apparatus 1 is provided with a communication unit TU and a printer unit PU, and both the units are mutually connected to each other through an interface 42.

The communication unit TU is provided with a CPU 30 that controls communications which are made with a facsimile machine 63 and a telephone 64 at a communication partner through a telephone exchange 62, controls various functions such as setting of transmission concentration, etc., controls the receiver volume of the receiver 11, controls the ringing sound volume output from a speaker 23 and the volume of voices under communication, and controls input/output of various data through PC (Personal Computer) 81 and PC interface 39, etc.

The CPU 30 is connected to a communication control circuit 41, and the communication control circuit 41 is connected to ROM 31 that stores a control program 31a with which the CPU 30 performs the above various control, RAM 32 that temporarily stores the control program 31a read out from ROM 31 and image information read out by the image scanner 37, EEPROM 33 which rewritably stores the FAX number of a facsimile machine 63 and the telephone number of a telephone 64 at a communication partner, NCU (Network Control Unit) 34 and a communication modem 60.

Further, the communication control circuit 41 is connected to an encoder 35 that codes the image information read out by the image scanner 37 to compress the image information to compressed data, a decoder 36 that decodes the compressed data obtained by coding the image information received, the operation panel 3, the speaker 23, the liquid crystal display portion 7, and an original sensor 40 that detects the setting of an original, which serves as a recording medium detector of the invention.

The printer unit PU is provided with a printer control circuit 43 that controls the printer 49, and the printer control circuit 43 is connected to a CPU 44 that executes a program to control the printer 49. The printer control circuit 43 is also connected to ROM 45 that stores a program executed by CPU 44, etc., RAM 46 with a work memory used at the operation executing time of CPU 44 and a print memory that stores print data, a PC interface 47 to which the PC 81 is connected, and a character generator (CG) 48 in which vector fonts such as print characters, etc. are stored.

Next, the content of the control which is executed by the CPU 30 to set various functions, such as setting of transmission concentration, etc. (hereinafter referred to as "function setting control"), which is the feature of the communication apparatus 1 of this embodiment, will be described with reference to FIGS. 3 to 9.

As shown in FIGS. 4A–4D, the liquid crystal display portion 7 is provided with a liquid crystal display screen 71a, a function switching button 72 that selects a function to be set, a transmission concentration down button (light) 71c that sets the transmission concentration so that the transmission concentration is lowered, and a transmission concentration up button (dark) 71d that sets the transmission concentration so that the transmission concentration is enhanced. The transmission concentration down button 71c and the transmission concentration up button 71d are also used as buttons to set various functions of the ringing sound volume, the receiver volume and the speaker volume. The liquid crystal display screen 71a displays each of the current statuses of the transmission concentration, the ringing sound volume, the receiver volume and the speaker volume by using the number of cursors.

Figure 5:
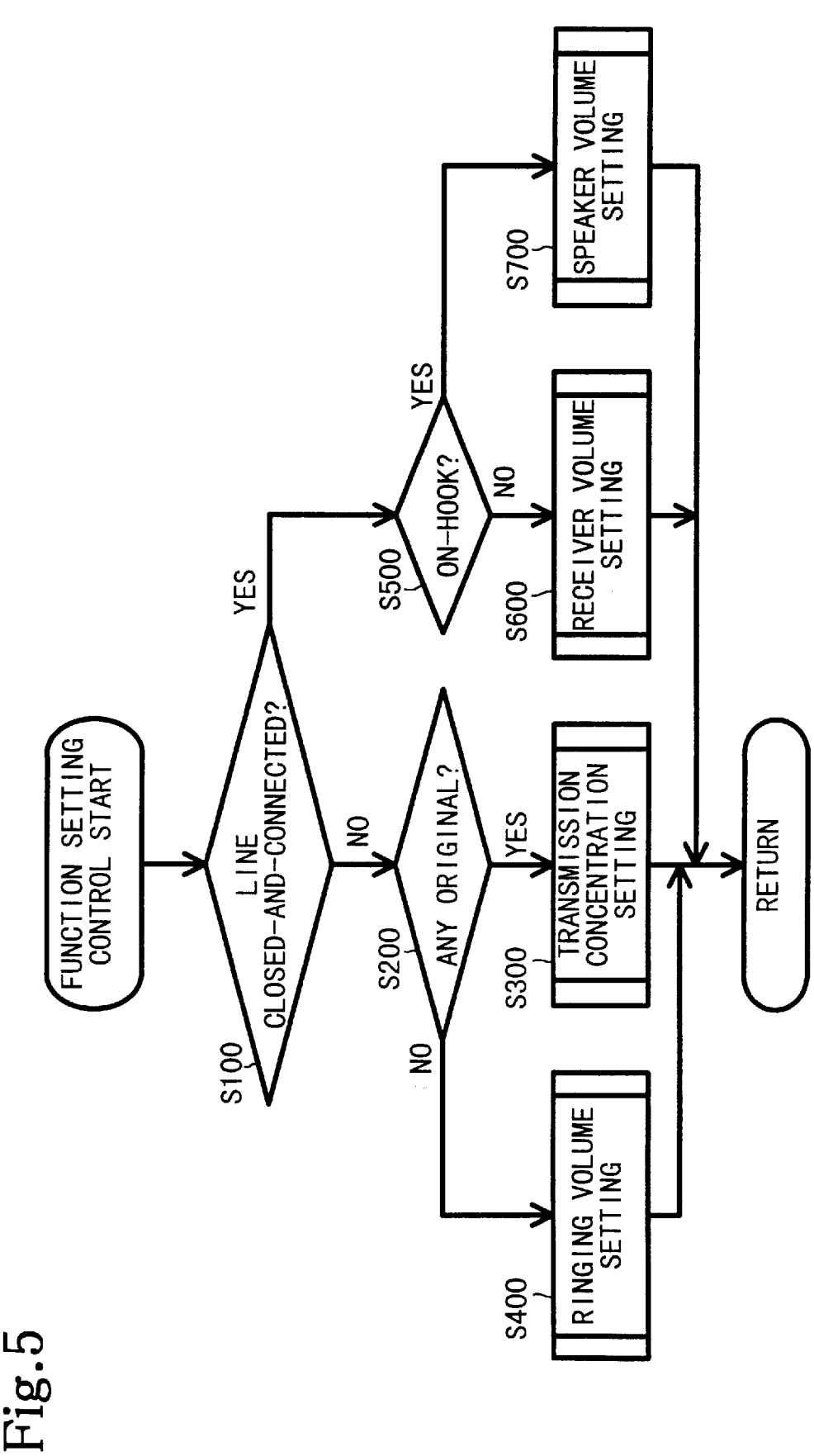
FIG. 5 is a flowchart showing function setting control executed by a CPU.

Next, the content of the function setting control executed by the CPU 30 will be described with reference to FIG. 5.

CPU 30 judges whether the telephone line 61 is closed and connected (S100). That is, it is judged whether the communication apparatus 1 concerned communicates with the facsimile machine 63 or the telephone at a communication partner.

If CPU 30 judges that the telephone line 61 is not closed-and-connected (S100:No), on the basis of a detection signal output from the original sensor 40, CPU 30 judges whether a transmission original for facsimile transmission is set in the original set portion (S200). Subsequently, if CPU 30 judges that the transmission original is set in the original set portion (S200:Yes), it executes transmission concentration processing (S300). That is, a user which is about to carry out facsimile transmission is enabled to set the transmission concentration immediately.

Figure 6:
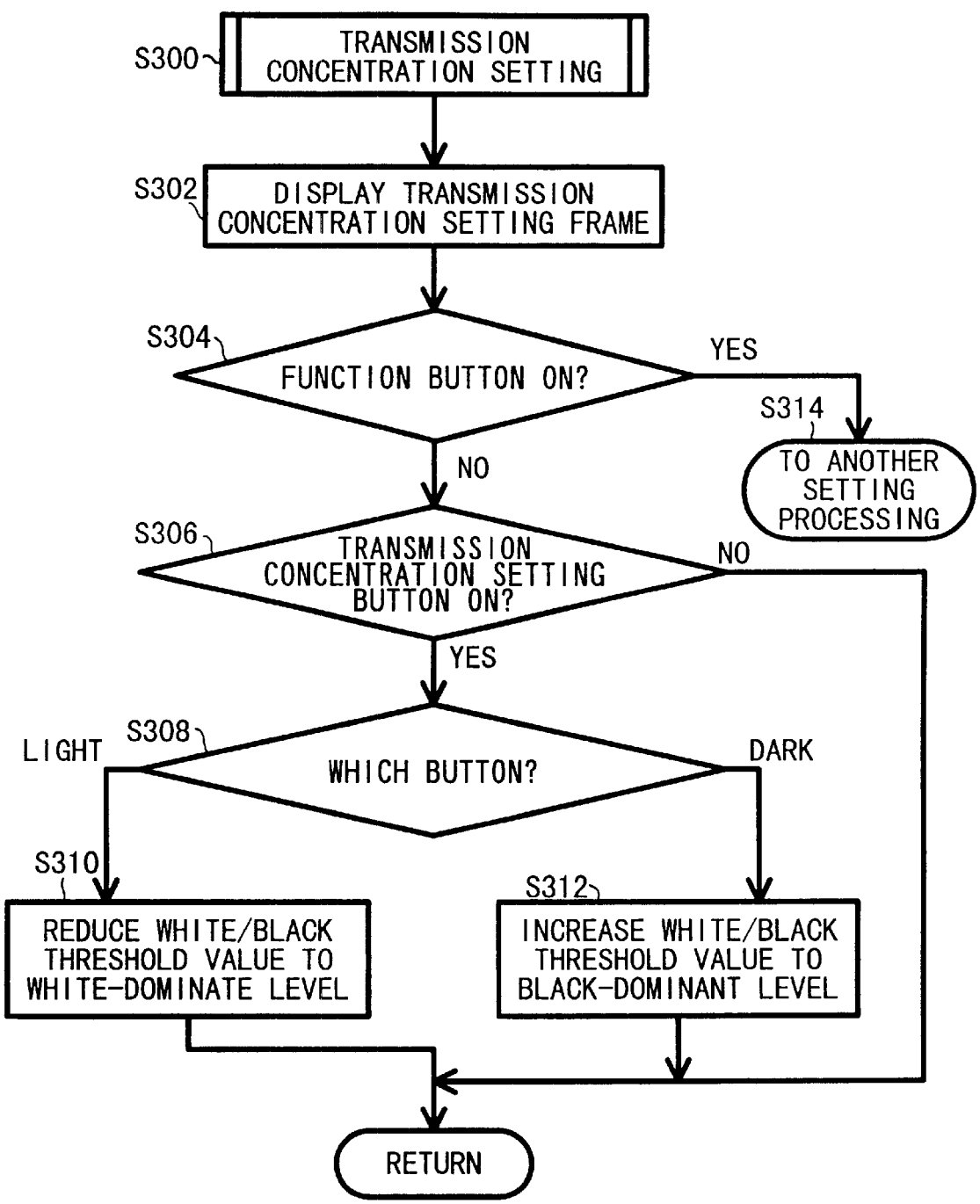
FIG. 6 is a flowchart showing transmission concentration setting processing which is executed in step 300 of FIG. 5 by the CPU.

Here, the transmission concentration setting processing will be described with reference to FIG. 6.

Figure 4A:
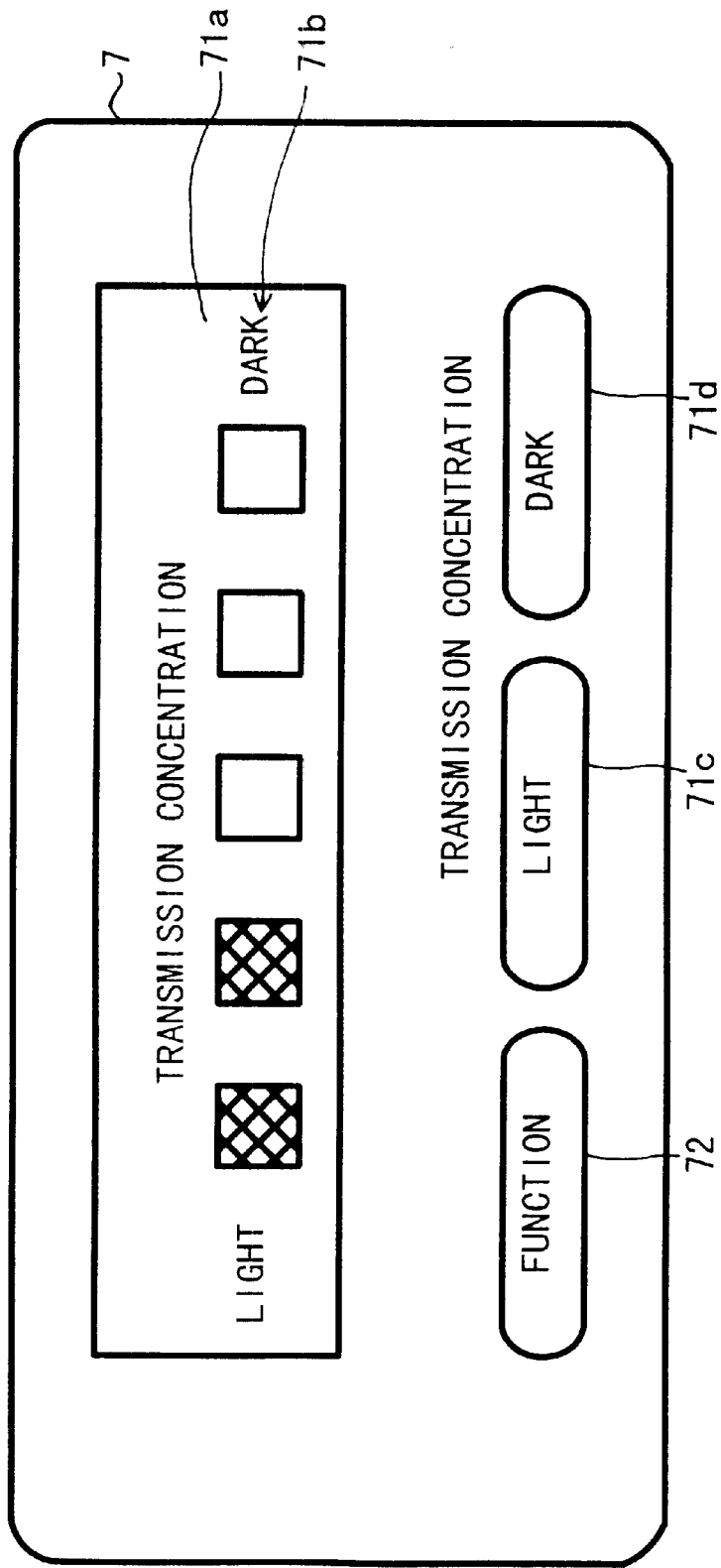
FIG. 4A is a diagram showing a transmission concentration setting frame displayed on a liquid crystal display portion.

As shown in FIG. 4A, CPU 30 displays a transmission concentration setting frame 71b on the liquid crystal display screen 71a of the liquid crystal display portion 7 (S302). The transmission concentration setting frame 71b is designed to indicate the transmission concentration with the number of cursors.

Thereafter, if CPU 30 judges that the function switching button 72 is not pushed (S304:No), it is judged whether "ON" is executed by pushing any transmission concentration setting button of the transmission concentration down button 71c and the transmission concentration up button 71d (S306). Thereafter, CPU 30 identifies which one of the transmission concentration down button 71c and the transmission concentration up button 71d was pushed (S308). If the pushed button is the transmission concentration down button 71c, CPU 30 performs processing so that the image scanner 37 reduces a threshold value for white and black concentration when image information is read out by the image scanner 37 (i.e., bar of judgment on "white" is more moderate" or shift the white/black concentration threshold value to a more white-dominant threshold value) to thereby reduce the transmission concentration (S310).

Figure 3A:
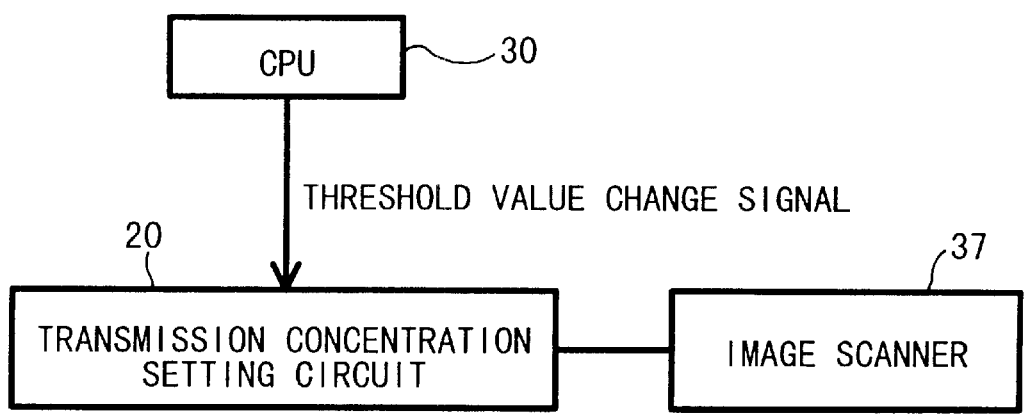
FIGS. 3A to 3C are diagrams showing electrical structures which are not shown in FIG. 2, where

In the processing carried out in S310, as shown in FIG. 3A, a threshold value change signal which instructs a reduction of the threshold value for white and black (i.e., shift the concentration to a more white-dominant area) is output from CPU 30 to the transmission concentration setting circuit 20, and the transmission concentration setting circuit 20 rewrites threshold value data set in a built-in threshold value setting memory or a threshold value setting memory provided at the image scanner 37 (not shown) so as to shift the white/black judgment threshold value to a more white-dominant judgment threshold value.

If CPU 30 judges in S308 that the pushed button is the transmission concentration up button 71d, it performs processing to increase the white/black judgement threshold value for the image information read out by the image scanner 37 so that a "black judgment" is more dominant (S312).

If CPU 30 judges in S304 that the function switching button 72 is turned on, the processing of CPU 30 skips to another setting processing corresponding to this switching operation (S314).

As described above, according to the function setting control executed by CPU 30, if the transmission original is set in the original set portion 5, the frame to set the reading concentration is automatically displayed. Therefore, a user who is about to perform facsimile transmission can immediately set the reading concentration without performing a cumbersome operation of switching the frame, and thus this embodiment is very convenient for users.

It is also possible to operate the transmission concentration down button 71c and the transmission concentration up button 71d so as to operate as a transmission resolution down button 71c and a transmission resolution up button 71d, respectively, in the same manner.

If CPU 30 judges in S200 that there is no transmission original (S200:No), it executes the ringing sound volume setting processing (S400). That is, in the case where CPU 30 waits for a communication from a communication partner, the ringing sound volume when a call is initiated from the communication partner is allowed to be set (changed).

Figure 7:
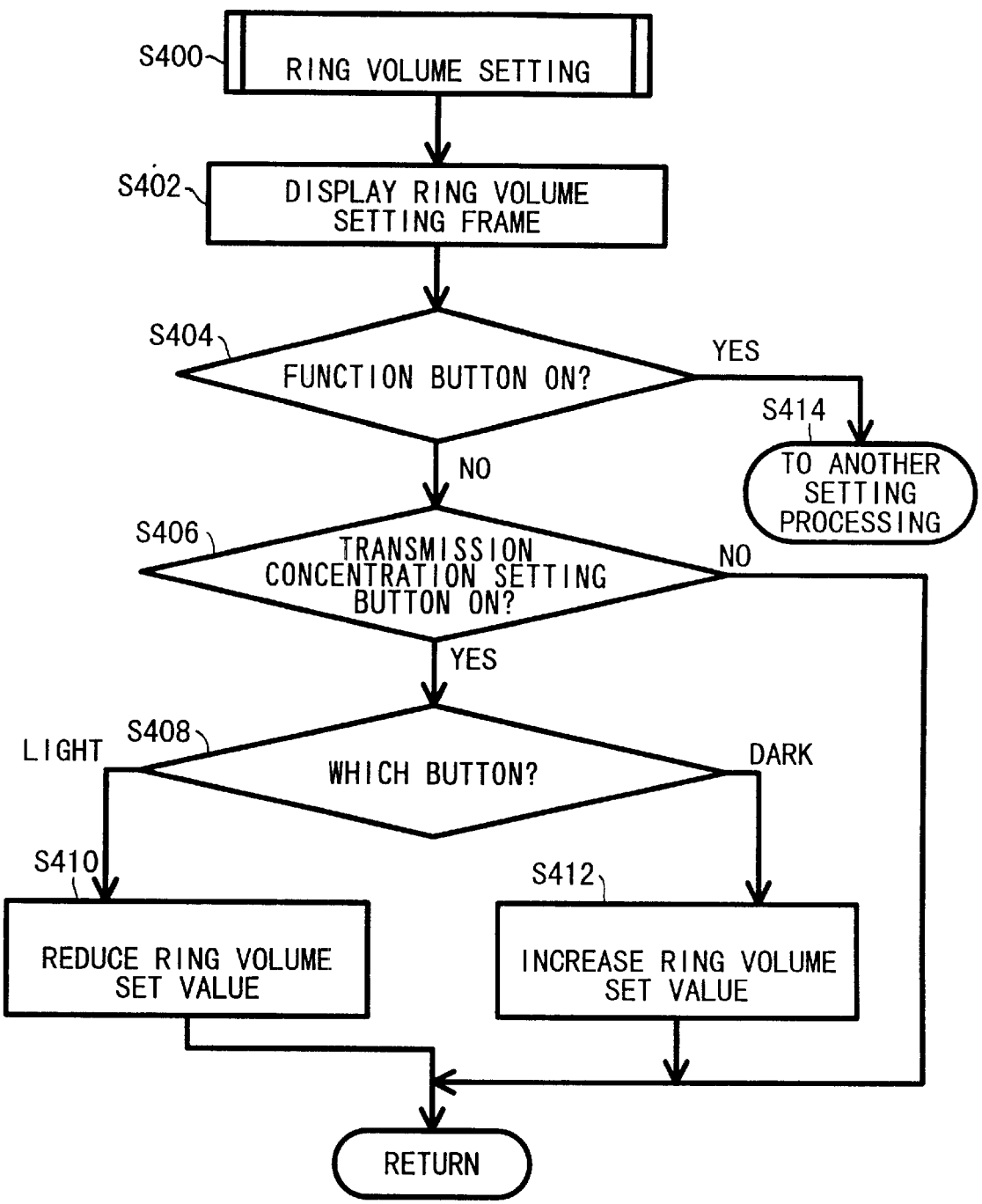
FIG. 7 is a flowchart showing ringing sound volume setting processing which is executed in step 400 by the CPU.

Here, the ringing sound volume setting processing will be described with reference to FIG. 7.

Figure 4B:
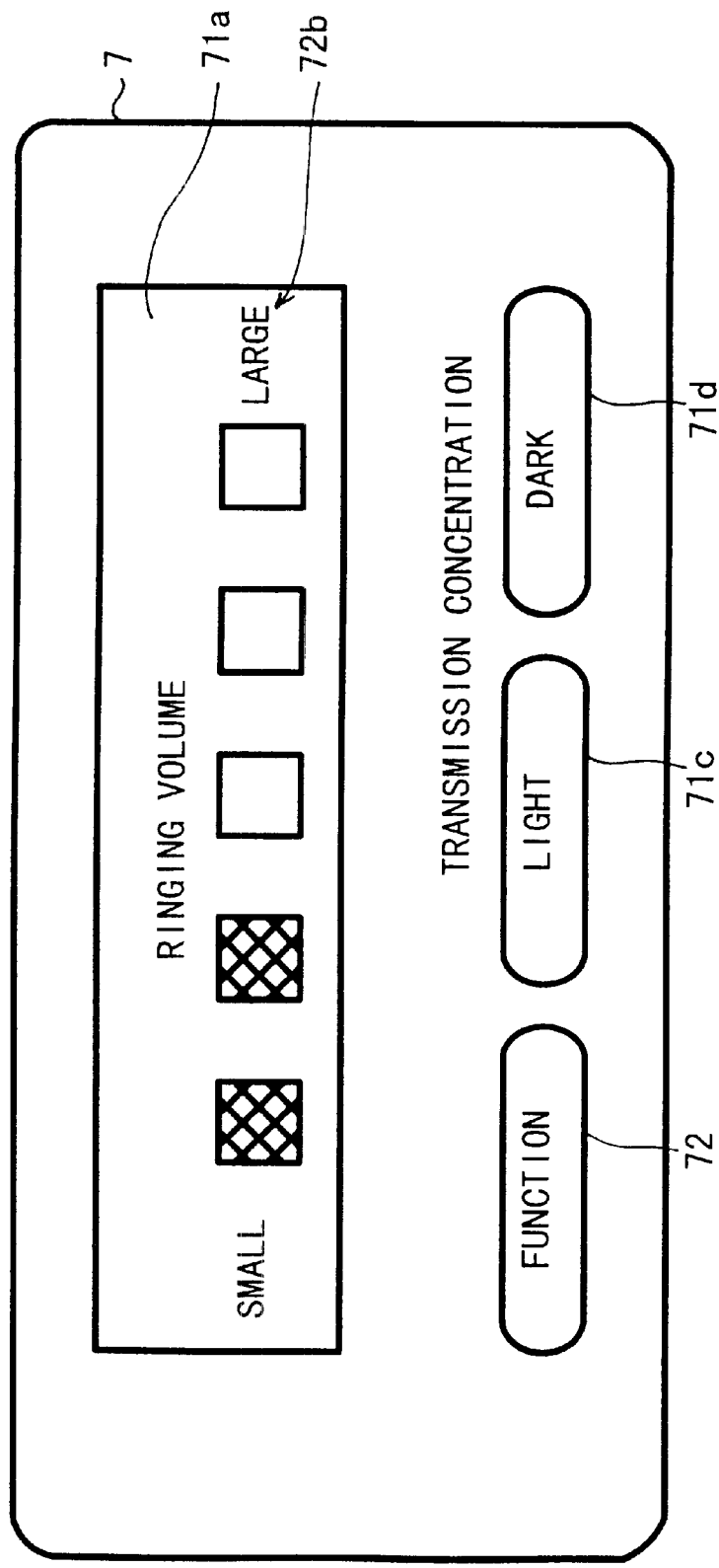
FIG. 4B is a diagram showing a ringing sound volume setting frame displayed on the liquid crystal display portion.

As shown in FIG. 4B, CPU 30 displays a ringing sound volume setting frame 72b on the liquid crystal display screen 71a of the liquid crystal display portion 7 (S402). The ringing sound volume setting frame 72b is designed to represent the ringing sound volume with the number of cursors.

That is, the ringing sound volume setting frame 72b also serves as the transmission concentration setting frame 71b, and the ringing sound volume setting button also serves as the transmission concentration setting button. Accordingly, the ringing sound volume is reduced by using the transmission concentration down button 71c, while increased by using the transmission concentration up button 71d.

If CPU 30 judges that the function switching button 72 is not pushed (S404:N), it is judged whether any setting button of the transmission concentration down button (ringing sound volume down button) 71c and the transmission concentration up button (ringing sound volume up button) 71d is pushed and turned on (S406). Subsequently, if the pushed button is the transmission concentration down button (ringing sound volume down button) 71c, CPU 30 performs processing to reduce the set value for the ringing sound volume output from the speaker 23, thereby turning down the ringing sound volume (S410).

Figure 3B:
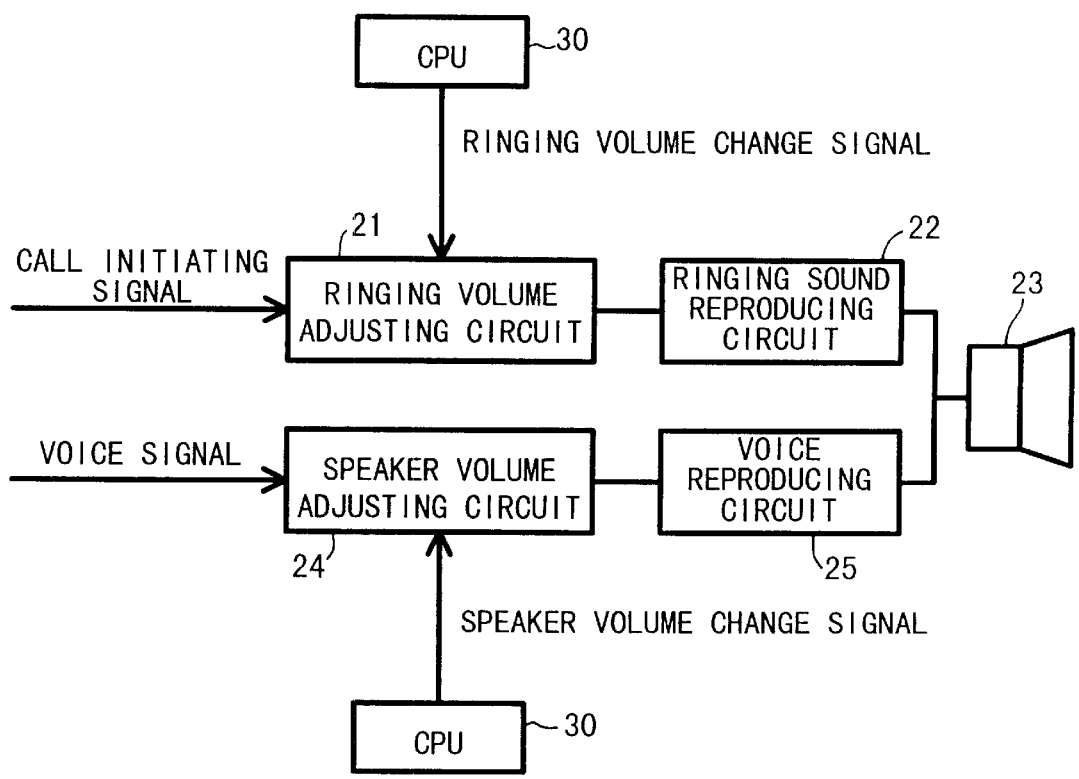

In S410, as shown in FIG. 3B, a ringing sound volume change signal, that instructs a reduction of the set value of the ringing sound volume, thereby turning down the ringing sound volume, is output from CPU 30 to a ringing volume adjusting circuit 21, and the ringing volume adjusting circuit 21 lowers the signal level of the ringing signal thus input, and then outputs it to a ringing sound reproducing circuit 22, whereby the ringing sound signal output from the ringing sound reproducing circuit 22 to the speaker 23 is lowered in level, and the volume of the ringing sound signal output from the speaker 23 is also turned down.

Further, if CPU 30 judges in S408 that the pushed button is the transmission concentration up button (ringing sound volume up button) 71d, it performs processing to increase the set value of the ringing sound volume output from the speaker 23, thereby turning up the ringing volume (S412).

If CPU 30 judges in S404 that the function switching button 72 is turned on, the processing of CPU 30 skips to another setting processing corresponding to this switching operation (S414).

As described above, according to the function setting control executed by CPU 30, when the communication apparatus 1 is waiting for a communication from a communication partner, it is automatically enabled to set the volume of the ringing sound when a call is initiated from the communication partner. Therefore, the user of the communication apparatus 1 concerned can immediately set the ringing sound volume without performing the extra operation of switching the setting of the functions, which is very convenient for users.

If CPU 30 judges in S100 that the telephone line 61 is closed-and-connected (S100:Yes), it judges whether the telephone receiver 11 is under an on-hook state or not (S500). If it is judged that the telephone receiver 11 is not under an on-hook state (step 500:No), CPU 30 sets the receiver volume (S600).

That is, the state that the telephone line 61 is closed-and-connected and the telephone receiver 11 is not under an on-hook state means that the telephone receiver 11 is being used for telephonic communication, and thus in such a state, the receiver volume of the telephone receiver 11 is enabled to be set (varied).

Figure 8:
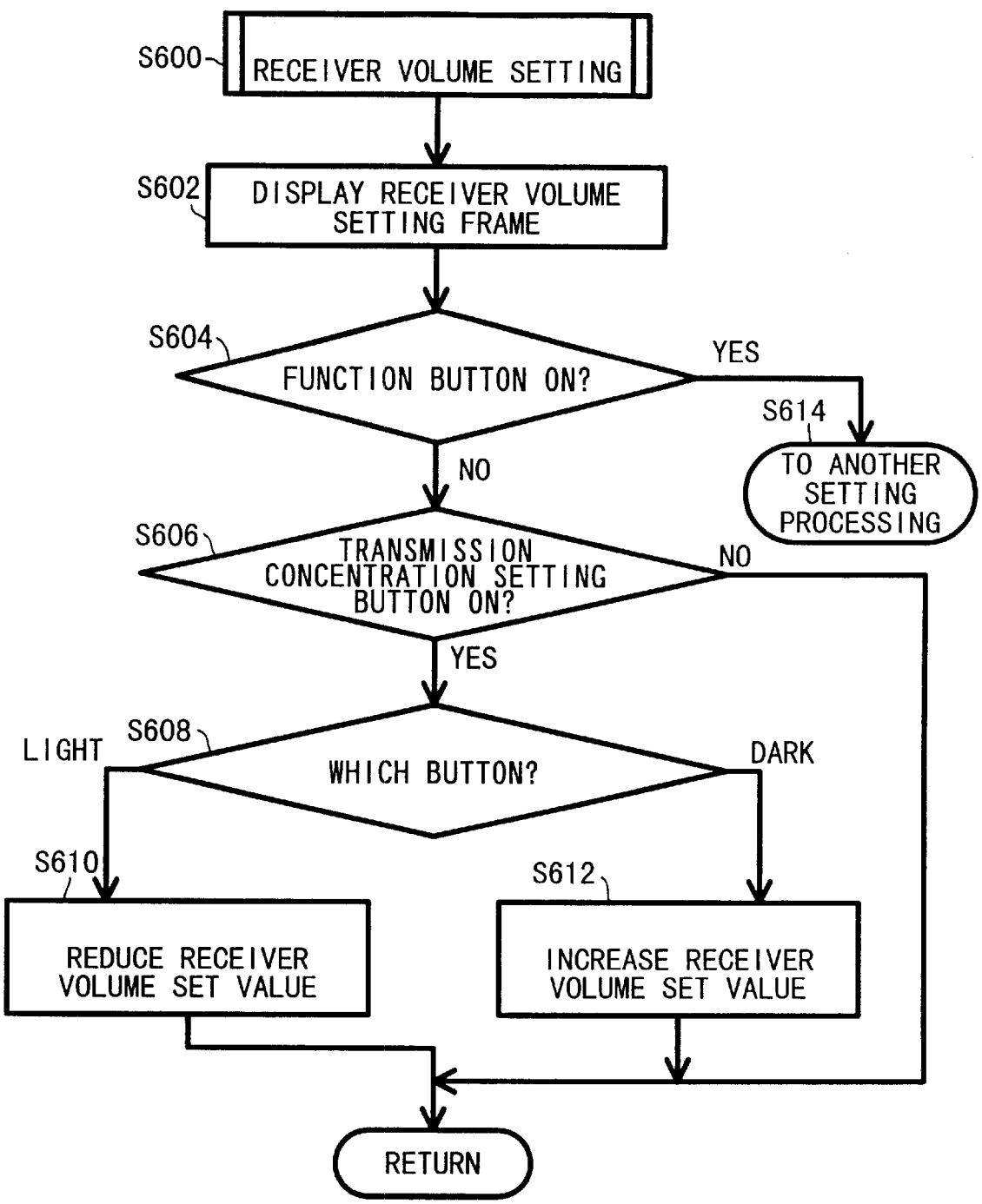
FIG. 8 is a flowchart showing receiver volume setting processing which is executed in step 600 of FIG. 5 by the CPU.

Here, the receiver volume setting processing will be described with reference to FIG. 8.

As shown in FIG. 4C, CPU 30 displays a receiver volume setting frame 73b on the liquid crystal display screen 71a of the liquid crystal display portion 7 (S602). The receiver volume setting frame 73b is represented with the number of cursors.

That is, the receiver volume setting frame 73b also serves as both the transmission concentration setting frame 71b shown in FIG. 4A and the ringing sound volume setting frame 72b shown in FIG. 4B. Further, the receiver volume setting button also serves as the transmission concentration setting button. Therefore, the receiver volume is reduced by using the transmission concentration down button 71c, while the receiver volume is increased by using the transmission concentration up button 71d.

If CPU 30 judges that the function switching button 72 is not pushed (S604:No), CPU 30 judges whether any setting button of the transmission concentration down button (receiver volume down button) 71c and the transmission concentration up button (receiver volume up button) 71d is pushed and turned on (S606). Subsequently, CPU 30 identifies which one of the transmission concentration down button (receiver volume down button) 71c and the transmission concentration up button (receiver volume up button) 71d is the pushed button (S608). If the pushed button is the transmission concentration down button (receiver volume down button) 71c, the set value of the receiver volume of the telephone receiver 11 is reduced to turn down the receiver volume (S610).

Figure 3C:
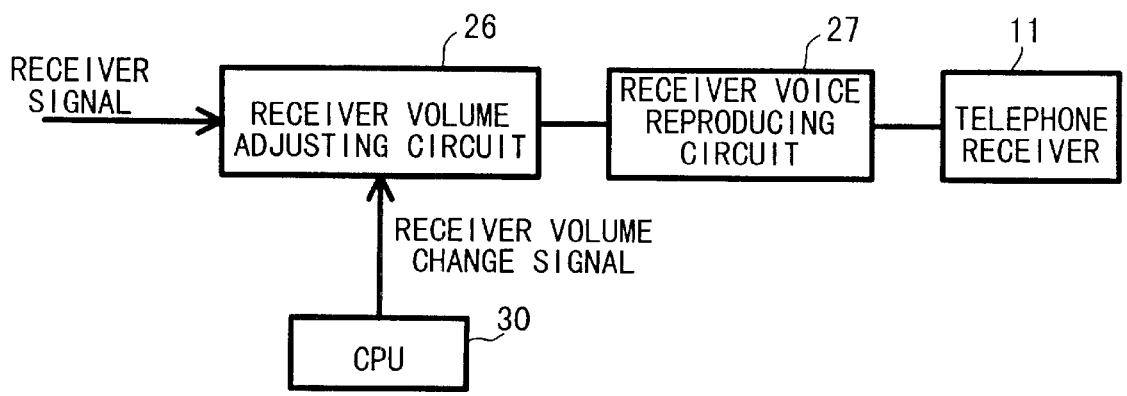

In S610, as shown in FIG. 3C, a receiver volume varying signal, that instructs a reduction of the set value of the receiver volume so as to turn down the receiver volume, is output from CPU 30 to the receiver volume adjusting circuit 26, and the receiver volume adjusting circuit 26 lowers the signal level of the receiver sound signal input thereto, and outputs it to a receiver voice reproducing circuit 27, whereby the receiver sound signal output from the receiver voice reproducing circuit 27 to the telephone receiver 11 is lowered in level, and the volume of the receiver sound output from the telephone receiver 11 is lowered.

Further, if CPU 30 judges in S608 that the pushed button is the transmission concentration up button (receiver volume up button) 71d, it performs processing to increase the set value of the receiver volume of the telephone receiver 11, thereby turning up the receiver volume (S612). If CPU 30 judges in S604 that the function switching button 72 is turned on, the processing of the CPU 30 skips to another setting processing corresponding to this switching operation (S614).

As described above, according to the function setting control executed by CPU 30, when a telephonic communication is being made by using the telephone receiver 11 equipped in the communication apparatus 1, the communication apparatus is automatically set to enable the setting of the receiver volume of the telephone receiver 11, so that the setting of the receiver volume can be immediately performed without having to change the setting of the functions, which is very convenient for users.

Further, if CPU 30 judges in S500 that the telephone receiver 11 is in the on-hook state (S500:Yes), it performs processing to set the volume output from the speaker 23 (S700).

That is, the state that the telephone line 61 is closed-and-connected and the telephone receiver 11 is in the on-hook state means the state that a telephonic communication is made while the telephone receiver 11 is placed on the body of the communication apparatus, i.e., it is a so-called handset communication (hand free communication). Thus, in such a case, the volume of the voices of a communication partner which are output from the speaker 23 can be set.

Figure 9:
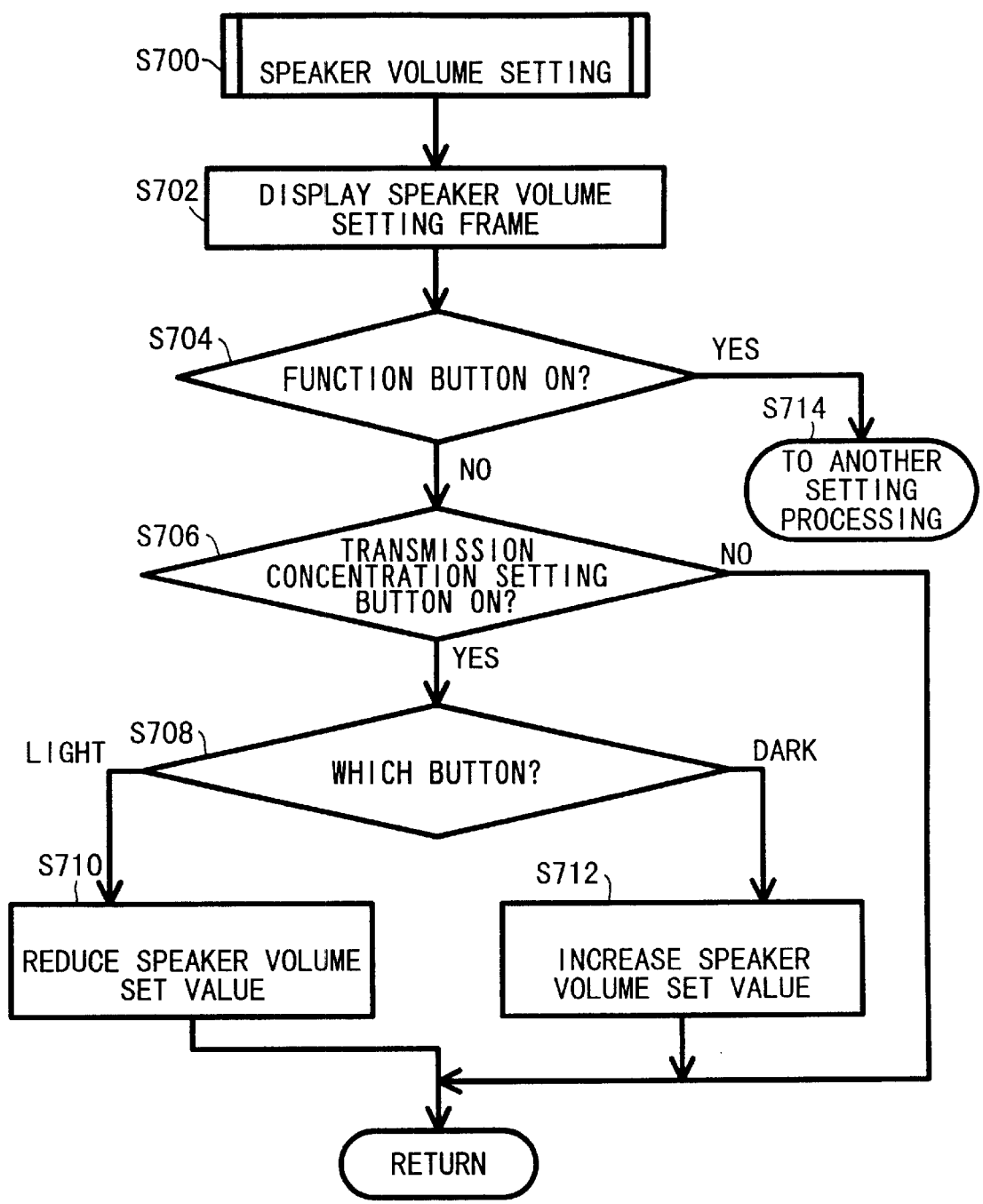
FIG. 9 is a flowchart showing speaker volume setting processing which is executed in step 700 by the CPU.

Here, the speaker volume setting processing will be described with reference to FIG. 9.

Figure 4D:
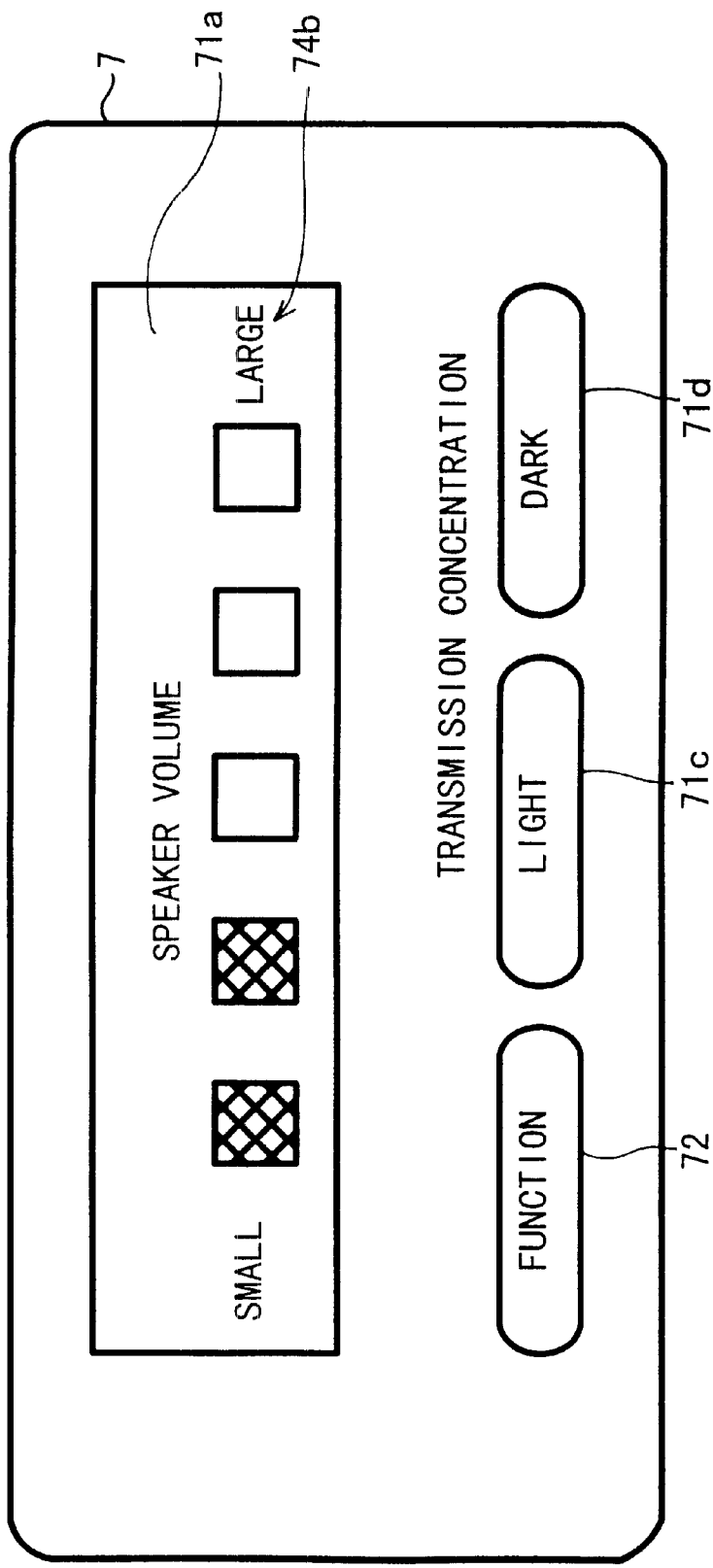
FIG. 4D is a diagram showing a speaker volume setting frame displayed on the liquid crystal display portion.

As shown in FIG. 4D, CPU 30 displays a speaker volume setting frame 74b on the liquid crystal display screen 71a of the liquid crystal display portion 7 (S702). The speaker volume setting frame 74b is designed to represent the speaker volume with the number of cursors.

That is, the speaker volume setting frame 74b also serves as each of the transmission concentration setting frame 71b shown in FIG. 4A, the ringing sound volume setting frame 72b shown in FIG. 4B and the receiver volume setting frame 73b shown in FIG. 4C. Further, the speaker volume setting button also serves as the transmission concentration setting button, and the speaker volume is reduced by using the transmission concentration down button 71c, while the speaker volume is increased by using the transmission concentration up button 71d.

If CPU 30 judges that the function switching button 72 is not pushed (S704:No), it judges whether the any setting button of the transmission concentration down button (speaker volume down button) 71c and the transmission concentration up button (speaker volume up button) 71d is pushed and turned on (S706). Subsequently, CPU 30 judges which one of the transmission concentration down button (speaker volume down button) 71c and the transmission concentration up button (speaker volume up button) 71d is the pushed button (S708). If the pushed button is judged as the transmission concentration down button (speaker volume down button) 71c (S708: light), the CPU 30 processes to reduce the set value of the volume of the voices output from the speaker 23 so as to turn down the volume (S710).

In S710, as shown in FIG. 3B, a speaker volume varying signal for instructing a reduction of the set value of the speaker volume, so as to turn down the volume, is output from CPU 30 to a speaker volume adjustment circuit 24, and the speaker volume adjustment circuit 24 lowers the signal level of the voice signal input thereto and outputs it to a voice reproducing circuit 25, whereby the voice signal output from the voice reproducing circuit 25 to the speaker 23 is lowered in level and the volume of the voices output from the speaker 23 is turned down.

Further, if CPU 30 judges that the transmission concentration up button (speaker volume up button) 71d is the pushed button (S708: dark), the CPU 30 processes to increase the set value of the volume of the voices output from the speaker 23, thereby turning up the volume (S712).

If CPU 30 judges in S704 that the function switching button 72 is turned on, the processing of the CPU 30 skips to another setting processing corresponding to this switching operation (S714).

As described above, according to the function setting control executed by the CPU 30, under the handset communication status, the communication apparatus is automatically enabled to set the volume of the voices of a communication partner which are output from the speaker 23, so that the volume of the voices output from the speaker 23 can be immediately set without having to change the setting of the functions, which is very convenient for users.

As described above, by using the communication apparatus 1 of this embodiment, CPU 30 identifies the use status of the communication apparatus 1, and the frame of the liquid crystal display portion 7 can be automatically switched to a frame matched with the use status. In addition, the setting frame and the setting button used to set each function are common, and thus the user of the communication apparatus 1 does not have to learn a lot of cumbersome operations, so that the user can immediately perform the setting needed for the current use status of the communication apparatus.

Accordingly, by using the communication apparatus of this embodiment, the operability can be enhanced. In addition, the number of buttons can be reduced to be less than that of conventional facsimile machines, and thus the manufacturing cost can be reduced.

In the above-described embodiment, the function setting control shown in FIGS. 5 to 9 is executed by the CPU 30 installed in the communication apparatus 1. However, this control may be executed by PC 81 (FIG. 2) connected to the communication apparatus 1. In this case, the communication apparatus 1 and PC 81 function as the communication apparatus of the invention.

When the function setting control is executed by PC 81 as described above, a computer program to execute the function setting control is stored in a storage medium, such as CD-ROM or FD, and the computer program stored in the storage medium is installed by using a drive provided to PC 81.

Next, another embodiment in which the invention applied to a facsimile machine will be described.

Figure 10:
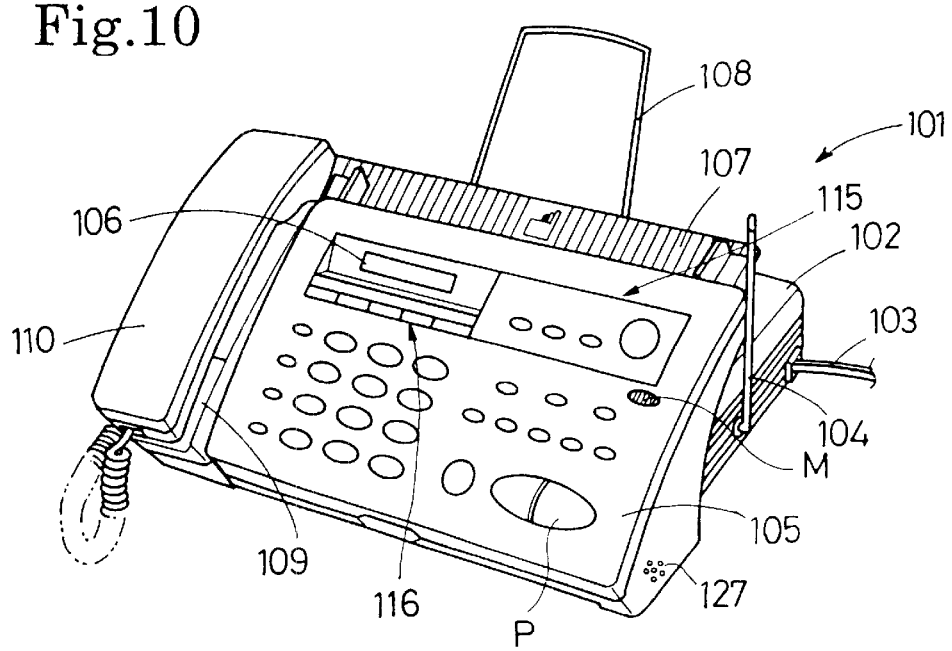
FIG. 10 is a perspective view showing the exterior of a facsimile machine according to an embodiment of the invention.

In FIG. 10, a facsimile machine 101 has an apparatus body 102. A power cord 103 and an antenna 104 that is used to communicate with a sub (slave) telephone receiver (not shown) are appended to the right side surface of the apparatus body 102. Further, an operation panel unit 105 is provided on the top surface of the apparatus body 102, and the operation panel unit 105 is provided with a liquid crystal display 106 serving as a display device. Further, a microphone M serving as an input device to input voices is provided at the lower portion at the same side of the antenna 104 of the operation panel unit 105.

At the rear portion of the apparatus body 102 is provided an original stacker 107 to stack originals to be read out while these originals are stacked. At the rear side of the original stacker 107 is disposed a sheet support 108. Further, a telephone receiver mount portion 109 is provided at the left side of the apparatus body 102, and a handset (hereinafter also referred to as "telephone receiver") 110 is mounted on the telephone receiver mount portion 109.

Further, a start key P that starts facsimile transmission is disposed at the right lower side of the operation panel unit 105, and various keys necessary for the facsimile machine 101 are properly arranged on the operation panel unit 105. A speaker 127 that outputs voices is also disposed at the lower side of the right side wall of the apparatus body 102.

Next, the function of the key group disposed on the operation panel unit 105 will be described with reference to FIG. 11.

Figure 11:
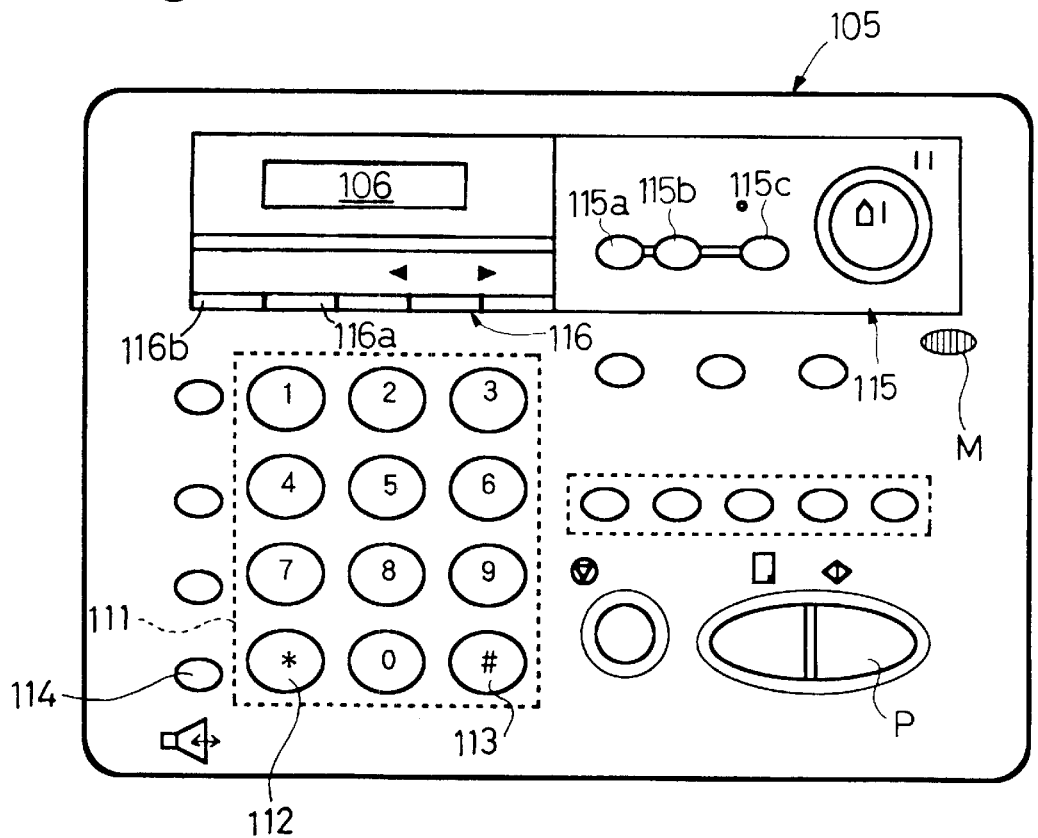
FIG. 11 is a front view showing an operation panel unit of a facsimile machine according to an embodiment of the invention.

In FIG. 11, a dial key 111 that inputs a dial number is disposed at the left side on the operation panel unit 105. The dial key 111 contains not only numerical keys from "1" to "0", but also an asterisk key 112 and a pound (#) key 113. A speakerphone key 114 is disposed at the left lower side of the dial key 111. The speakerphone key 114 is a key that sets a speakerphone mode in which the communication based on the telephone receiver 110 is switched to the communication based on a microphone M and the speaker 127 to enable communication without using the telephone receiver 110.

An automatic telephone message recording function portion 115 is disposed at the right side of the liquid crystal display 106, and a message recording key 115a, a delete key 115b and a reproducing key 115c which are used to operate the automatic telephone message recording function portion 115, are juxtaposed with one another. Further, five function keys 116 are juxtaposed with one another between the liquid crystal display 106 and the dial key 111, and two of these five keys serve as a volume adjustment key 116a to increase the volume in proportion to the push time of the key, and a volume adjustment key 116b to reduce the volume in proportion to the push time of the key. The volume adjustment key 116a serves as a resolution change key under a predetermined condition, while the volume adjustment key 116b serves as a call reception mode changing key. As a modification, these two keys may be designed to be changed to be the resolution change key or the call reception key by operating both of the two keys 116a, 116b.

Next, the control system of the above-described facsimile machine will be described with reference to FIG. 12.

Figure 12:
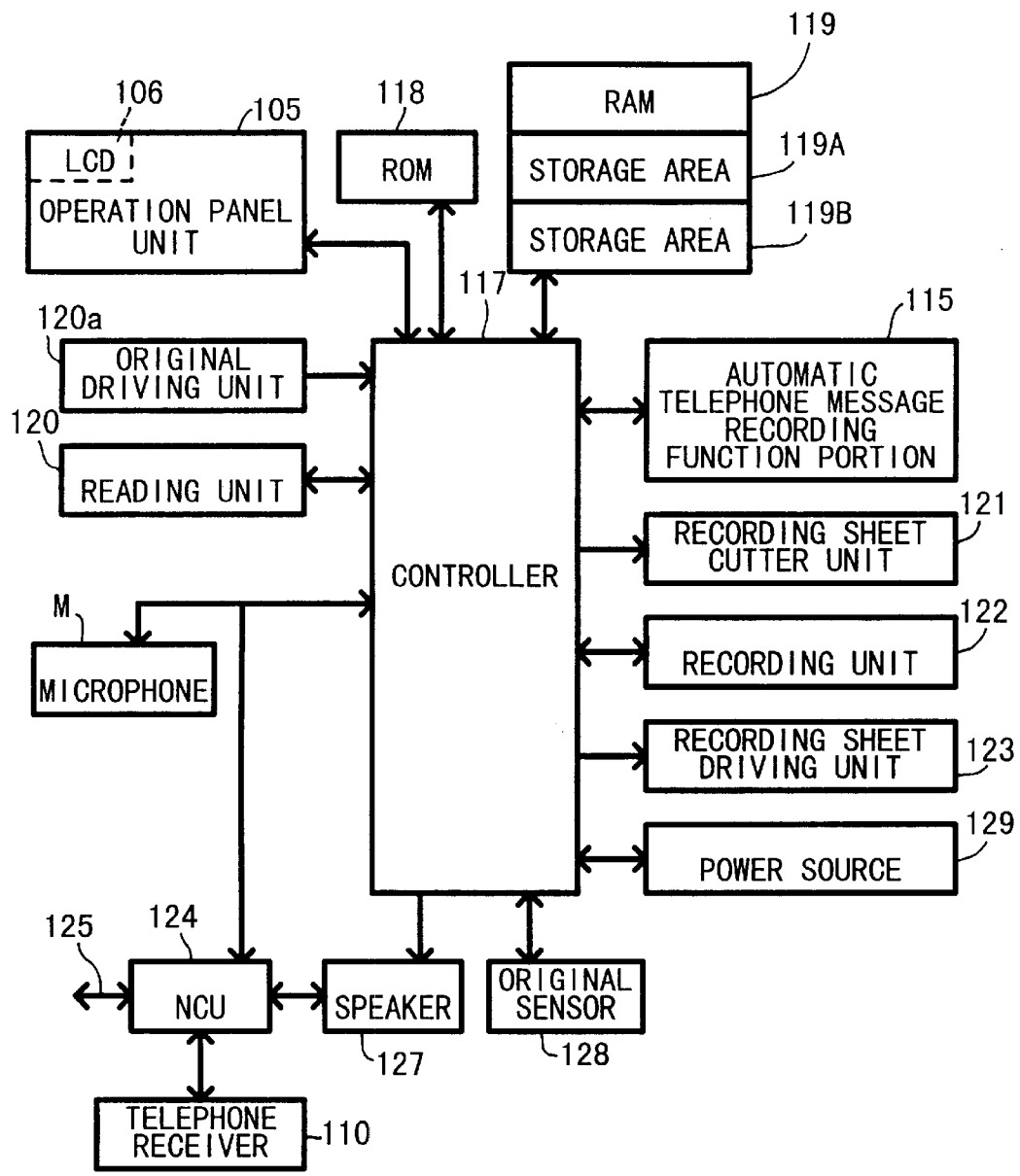
FIG. 12 is a block diagram showing a control system of the facsimile machine of the embodiment of the invention.
Figure 14:
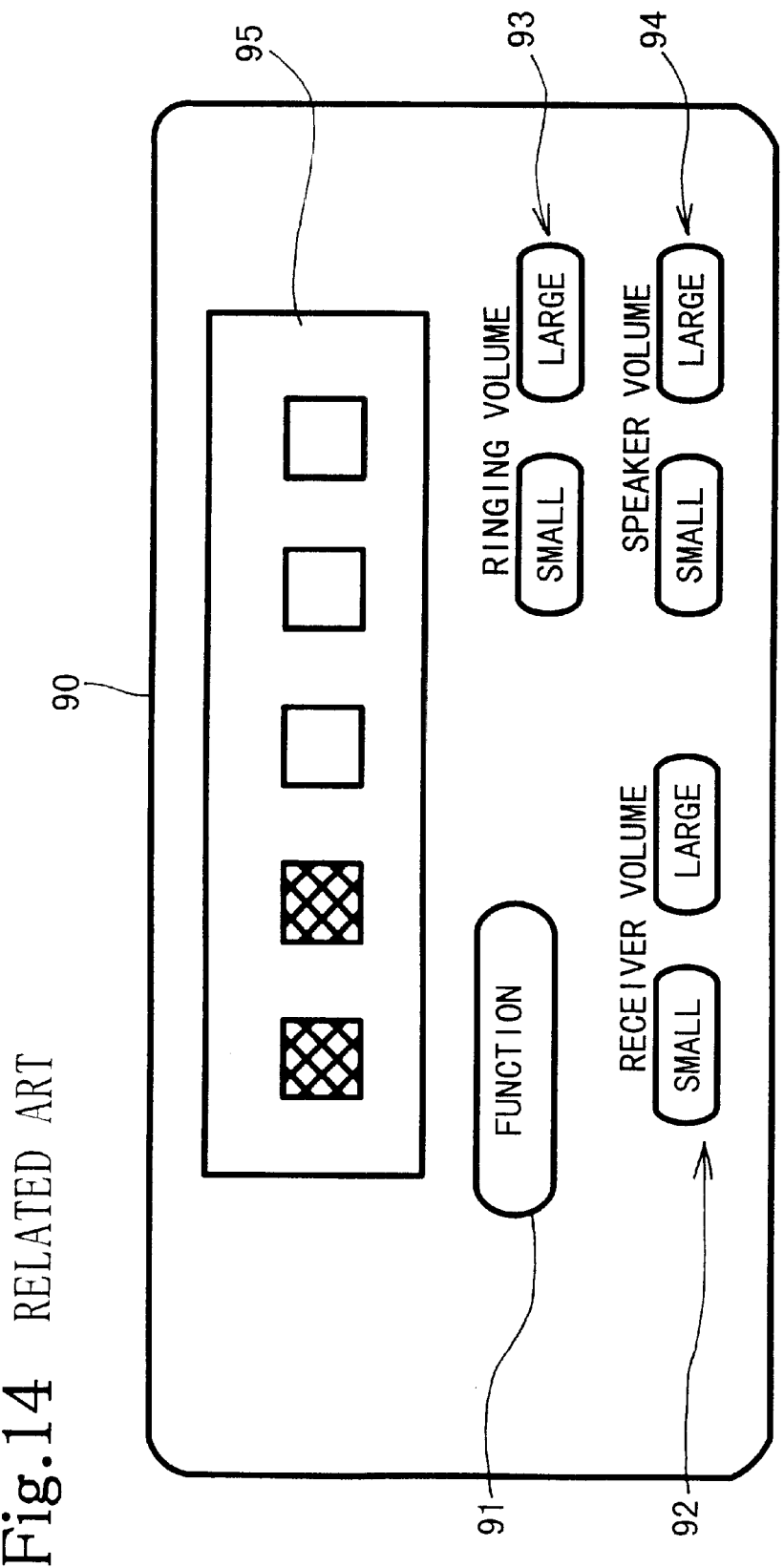
FIG. 14 is a diagram showing an operation panel of a conventional facsimile machine.

In FIG. 12, the control system of the facsimile machine 101 has a controller 117 which is constructed to have CPU as a core. ROM 118 and RAM 119 are connected to the controller 117. A control program shown in FIG. 14 is stored in ROM 118. Various other programs needed to execute facsimile functions are also stored in ROM 118.

RAM 119 temporarily stores various data calculated through CPU, and it is provided with a storage area 119A that stores voice information, etc. and a storage area 119B that stores image information, etc. as shown in FIG. 12. When information received from a communication partner is facsimile information, the facsimile information is stored in the storage area 119B, and when a memory transmission is performed by using the facsimile machine 101, facsimile information for transmission is stored in the storage area 119B. On the other hand, when information received from the communication partner is voice information, or in the case of voice information input through the microphone M, it is converted to a digital signal by the automatic telephone message recording function portion 115, and the digital voice information thereof is stored in the storage area 119A.

When the facsimile machine 101 functions as a telephone with an automatic telephone message recording function, the automatic telephone message recording function portion 115 is actuated. Therefore, voice information received from a communication partner, or voice information which is input from the microphone M when a user operates the recording key 115a, is converted to a digital signal in the automatic telephone message recording function portion 115, and the digital voice information is stored in the storage area 119A.

When the user operates the delete key 115b, the automatic telephone message recording function portion 115 deletes the digital voice information stored in the storage area 119A. When the user operates the reproducing key 115c, the automatic telephone message recording function portion 115 converts the digital information stored in the storage area 119A to an analog voice signal, and the analog voice signal is output from the speaker 127, or output through the telephone line 125 or the like, to a communication partner. The controller 117 monitors the status of the automatic telephone message recording function portion 115 to judge whether the voice reproduction based on the speaker 127 is being performed or not.

The controller 117 is connected to an operation panel unit 105 that has a liquid crystal display (LCD) 106, a reading unit 120 that contains a CCD device (not shown) that reads characters, figures, etc. of a reading target original fed from the original stacker 107 into the apparatus body 102, and a original driving unit 120a that performs original feeding control while driving the CCD device. Further, the controller 117 is connected to a recording sheet cutter unit 121 that cuts a recording sheet by driving a cutter (not shown) through a cutter driving motor (not shown), a recording unit 122 that contains a print head (not shown) to print the image information received through the telephone line 125 onto the recording sheet, and a recording sheet driving unit 123 that performs the feeding control of the recording sheet while driving the print head. Further, the controller 117 is connected to an original sensor 128 that serves as an original detection device that detects whether the original is set to a reading position.

The controller 117 is also connected to the telephone line 125 as a communication line through NCU 124, and the telephone receiver 110 is connected to NCU 124. The controller 117 is further connected to a speaker 127 that outputs a voice signal, and the digital information stored in the storage area 119A or the like is converted to an analog voice signal in the automatic telephone message recording function portion 115. Thus, the speaker 127 supplied with the analog voice signal outputs the voice signal. The controller 117 outputs a control signal that adjusts the sound volume to the speaker 127 to control the magnitude of the voice when the speaker 127 outputs the voice signal. Specifically, the controller 117 detects the push time of the volume adjustment keys 116a, 116b, and outputs to the speaker 127 the volume adjusting control signal to output the sound volume in proportion to the push time.

In order to control the magnitude of the voice when the telephone receiver 110 outputs the voice signal, the controller 117 outputs a volume adjusting control signal to the telephone receiver 110. Specifically, the controller 117, which detects the push time of the volume adjustment keys 116a, 116b, outputs to the telephone receiver 110 a volume adjusting control signal to output the sound volume in proportion to the push time. A power source 129 is also connected to the controller 117.

The controller 117 monitors the status of NCU 124 to judge whether the current status of the apparatus is a line closed-and-connected status in which a telephone conversation or communication can be made with a communication partner through the telephone line 125, or a line non-closed-and-connected status in which neither telephone conversation nor communication can be made with the communication partner. In this embodiment, the line closed-and-connected status means the state where the telephone receiver 110 is not connected to the telephone receiver mount portion 109 (hereinafter referred to as "receiver use status"), or the status where the speakerphone key 114 is pushed and the communications are allowed, and the controller 117 can identify whether the current status is the line closed-and-connected status or not. Thus, it constitutes a line status identifying device.

The controller 117 can detect whether the telephone receiver 110 is mounted on the receiver mount portion 109, and thus it constitutes a handset detection device that detects whether the telephone receiver 110 is used or not. Further, the controller 117 can identify whether the speakerphone key 114 is pushed to make the communications allowed, and thus it constitutes a speaker output mode identifying device.

In the facsimile machine 101 thus constructed, when a general facsimile transmission is performed, a read-out original is set in the original stacker 107, and the facsimile number of a transmission destination is input by operating the dial key 111, and then the start key P on the operation panel unit 105 is pushed. With the above operation, the read-out original is fed into the facsimile machine 101, and under the control of the controller 117, the image data of the original are read out through the reading unit 120, and then the image data which have been compressed and converted are transmitted through NCU 124 and the telephone line 125 to the transmission destination.

When image data are transmitted from a communication partner through the telephone line 125 and NCU 124 to the facsimile machine 101, the controller 117 that receives the image data demodulates and restores the image data to print the image data on a recording sheet that is accommodated in the apparatus body 102, while controlling the driving of the print head and the recording sheet driving unit 123 of the recording unit 122. After the print is finished, the controller 117 drives the recording sheet cutter unit 121 to cut out a printed recording sheet, thereby completing the reception operation.

Here, the relationship between the image information input by the reading unit 120 and the change of the reading resolution will be described.

The reading resolution in the auxiliary scan direction is determined on the basis of the original feeding amount to the reading position in the auxiliary scan direction and the reading timing of the reading unit 120. That is, when 300 pixels per 1-inch are read out, the reading operation is performed by the reading unit 120 every time the original is fed by a distance (about 0.08 mm) (=1 inch/300). On the other hand, when 200 pixels per 1-inch are read out, the reading operation is performed by the reading unit 120 every time the original is fed by a distance (about 0.12 mm) (=1 inch/200). As described above, as the original feeding amount in the auxiliary scan direction is reduced in the reading operation, the number of pixels to be read out per 1-inch is larger, and thus the reading resolution is enhanced. On the other hand, as the original feeding amount in the auxiliary scan direction in the reading operation is increased, the number of pixels to be read out per 1-inch is smaller, and thus the reading resolution is lowered.

When the user operates resolution change key 116a to switch the current reading resolution to "fine reading" or "normal reading," when the volume adjustment key 116a becomes the resolution change key 116a under a predetermined condition, for example, the reading resolution can be changed to "300×300 per 1 square inch" (pixel number in main scan direction x pixel number in auxiliary scan direction) or "300×200 per 1 square inch" (pixel number in main scan direction x pixel number in auxiliary scan direction), and the reading unit 120 can read the image data on the original with the reading resolution thus set.

Next, a copy operation in which the image information input by the reading unit 120 is recorded by the recording unit 122 that serves as the recording portion will be described.

When the read-out original is fed into the apparatus body 102, under the control of the controller 117, the image data of the original are read out by the reading unit 120, and the image data thus read are supplied to the recording unit 122. Therefore, the print head and the recording sheet driving unit 123 of the recording unit 122 prints the image data onto the recording sheet that is accommodated in the apparatus body 102. After the print is finished, the controller 117 drives the recording sheet cutter unit 121 to cut out a printed recording sheet, thereby completing a copy operation. In this case, in order to simplify the description, it is assumed that one image data input corresponds to a pixel recorded on the recording sheet.

The recording density of the copy operation in the auxiliary scan direction is determined by the relationship between the feed amount of the recording sheet to the recording position in the auxiliary scan direction and the recording timing of the recording unit 122. That is, when 300 pixels per 1-inch are recorded, the recording operation is performed by the recording unit 122 every time the recording sheet is fed by a distance (about 0.08 mm) (=1 inch/300). On the other hand, when 200 pixels per 1-inch are recorded, the recording operation is performed by the recording unit 122 every time the recording sheet is fed by a distance (about 0.12 mm) (=1 inch/200). Therefore, as the feed amount of the recording sheet in the auxiliary direction in the copy operation is reduced, the number of recording pixels per 1-inch is larger, and thus the recording density is enhanced. On the other hand, as the feed amount of the recording sheet in the auxiliary direction in the copy operation is increased, the number of recording pixels per 1-inch is smaller, and thus the recording density is lowered.

When the user operates the resolution change key 116a for the copy operation, when the volume adjustment key 116a becomes the resolution change key 116a under a predetermined condition, the recording resolution can be changed to "fine recording mode" or "normal recording mode". In this case, under the control of the controller 117, the recording unit 122 can perform the copy operation at a recording density of "300×300 per 1 square inch" (pixel number in main scan direction x pixel number in auxiliary scan direction) in the "fine recording mode". On the other hand, it can perform the copy operation at a recording density of "300×200 per 1 square inch" (pixel number in main scan direction x pixel number in auxiliary scan direction).

Further, when the user operates the call reception mode change key 116b, when the volume adjustment key 116b becomes the call reception change key 116b under a predetermined condition, the controller 117 controls NCU 124 to switch the mode to "automatic reception mode" for receiving image information and voice information in accordance with an automatically changed receiving operation, "manual reception mode" for receiving image information and voice information in accordance with a manually changed receiving operation, "facsimile communication mode" for receiving in accordance with an image information receiving operation, "telephone conversation mode" for receiving in accordance with an image information receiving operation, and "automatic telephone message recording mode" for receiving and storing an incoming voice message, in turn.

Figure 13:
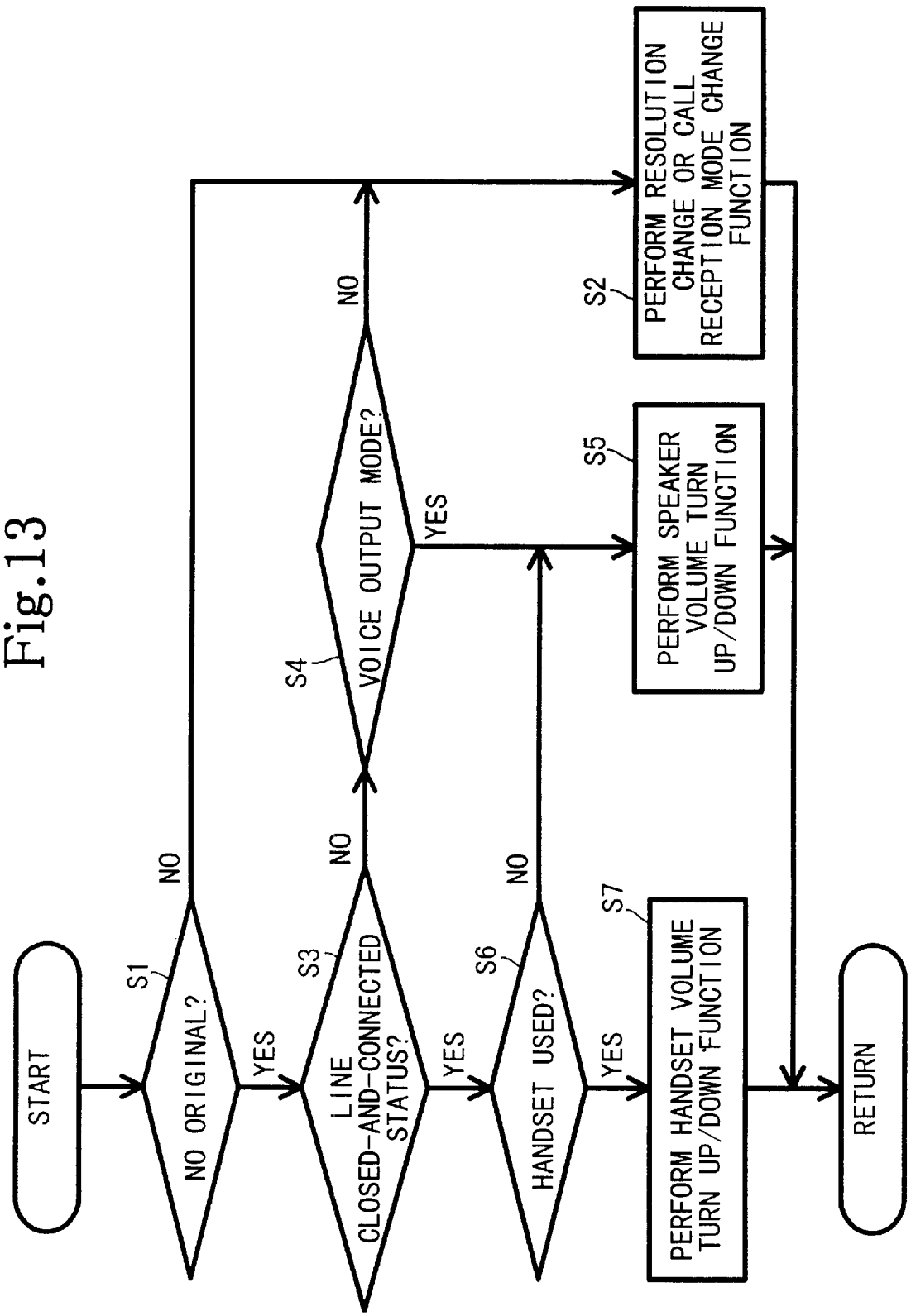
FIG. 13 is a flowchart showing a function changing operation of a volume adjustment key according to the embodiment of the invention.

Next, the control operation of the function switching of the volume adjustment keys 116a, 116b of the facsimile machine 101 thus constructed will be described with reference to FIG. 13.

The controller 117 is supplied with a detection signal from the original sensor 128, and judges whether the original is located at a predetermined position (S1). If the controller 117 judges that the original is located at the predetermined position (S1:No), the volume adjustment keys 116a, 116b become the resolution change key 116a and the call reception mode change key 116b (S2). When the resolution change key 116a is pushed, the reading resolution or the recording density in the copy operation (pixel number per 1-inch in main scan direction X pixel number per 1-inch in auxiliary scan direction) in the reading resolution is alternately switched between (300×300) and (300×200).

Further, when the call reception mode change key 116b is pushed, the call reception mode is successively switched like the switching of the "automatic reception mode", "manual reception mode", etc. Accordingly, when the original is set at the reading position, the controller 117 controls the volume adjustment keys 116a and 116b to perform the resolution changing function and the call reception mode changing function, respectively.

The volume adjustment keys 116a, 116b and the resolution change key 116a and the call reception mode change key 116b are commonly used, because when the user sets the original at a predetermined reading position, it is expected that the user intends to copy the original or perform facsimile transmission, and has no intention of adjusting the volume by using the volume adjustment keys 116a, 116b.

When the controller 117 judges that the original is not located at the predetermined position (S1: Yes), it judges whether the line status is the line closed-and-connected status or not (S3). When it is not the line closed-and-connected status, that is, no communication cannot be made through the telephone line 125 (S3:NO), the controller 117 judges whether the mode is the voice reproduction mode or not (S4).

That is, since there is a case where the user wants to use the automatic telephone message recording function by operating the reproduction key 115c even when the controller 117 detects that the telephone receiver 110 is not used (the telephone receiver 110 is mounted on the telephone receiver mount portion 109) or the speakerphone key 114 is not pushed (the communication is not allowed), the controller 117 judges whether the reproduction key 115c is in the operation-based voice reproduction mode or not. Here, the voice reproduction mode is a mode in which the automatic telephone message recording function portion 115 is actuated to convert the digital voice information stored in the storage area 119A to an analog voice signal and output the analog voice signal from the speaker 127.

When the mode is not the voice reproduction mode (S4:NO), the volume adjustment keys 116a, 116b become the resolution change key 116a and the call reception mode change key 116b as in the above case (S2). The reason for this is as follows. When the telephone receiver 110 is not used (the telephone receiver 110 is put on the receiver mount portion 109) and when the speakerphone key 114 is not pushed (the communication is not allowed), and when the user does not operate the reproduction key 115c, the automatic telephone message recording function portion 115 does not output the analog voice signal from the speaker 127, so that it is more convenient for the user to make the keys 116a, 116b function as the resolution change key and the call reception mode change key, respectively, than as the volume adjustment keys.

Here, when the user pushes the reproduction key 115c, the controller 117 identifies the voice reproduction mode (S4:Yes), so that the volume adjustment keys 116a, 116b become the volume adjustment keys for the speaker 127 (S5). Specifically, the volume adjustment key 116a functions to turn up the volume of the speaker 127 in proportion to the push time of the key, and the volume adjustment key 116b functions to turn down the volume of the speaker 127 in proportion to the push time of the key. Accordingly, when the user pushes the reproduction key 115c, the controller 117 identifies the voice output mode and the controller 117 identifies the line non-closed-and-connected status, the controller 117 controls the volume adjustment keys 116a, 116b to perform the volume up/down function of the speaker 127. Therefore, by properly operating the volume adjustment keys 116a, 116b, the user can listen to the message stored in the storage area with a proper sound volume.

In the case of the line closed-and-connected status, that is, when the communication or the like can be made through the telephone communication 125 (S3:YES), the controller 117 judges whether the telephone receiver 110 is used (S6). If the user does not use the telephone receiver 110, but pushes the speakerphone key 114 (S6: NO), the volume adjustment keys 116a, 116b become the volume adjustment keys for the speaker 127 (S5). In this case, the volume adjustment key 116a achieves the function of increasing the volume of the speaker 127 in proportion to the push time of the key, while the volume adjustment key 116b achieves the function of reducing the volume of the speaker 127 in proportion to the push time of the key, as in the above case.

Accordingly, when the telephone receiver 110 is not used and the speakerphone key 114 is pushed to close and connect the telephone line, the controller 117 controls the volume adjustment keys to achieve the volume up/down functions of the speaker 127, respectively. Therefore, the user can listen to the message stored in the storage area 119A at a proper sound volume.

On the other hand, if the user does not push the speakerphone key 114 (S6: Yes), the volume adjustment keys 116a, 116b become the volume adjustment keys for the telephone receiver 110 (S7). Specifically, the volume adjustment key 116a achieves the function of turning up the volume of the receiver 110 in proportion to the push time of the key, and the volume adjustment key 116b achieves the function of turning down the volume of the receiver 110 in proportion to the push time of the key. Accordingly, when the line is under the line closed-and-connected status and the telephone receiver 110 is used, the controller 117 controls the volume adjustment keys 116a, 116b to achieve the communication volume up/down functions of the receiver (handset) 110, so that the user can have a telephone conversation with a communication partner at a proper volume by properly operating the volume adjustment keys 116a, 116b.

The invention is not limited to the above embodiments, and various modifications may be made without departing from the subject matter of the invention. For example, the terminal apparatus of the invention is not necessarily limited to a facsimile machine, and the invention may be applied to other terminal apparatuses, such as a telephone apparatus, a computer, etc., for example. Further, the prescribed keys 116a, 116b may operate as function keys other than the resolution change key and the call reception mode change key when the current mode is out of the voice output mode. For example, the prescribed keys 116a, 116b can operate as concentration change keys that change a transmission concentration, instead of operating as resolution change keys.

What is claimed is:

1. A communication apparatus, which has a housing, for performing communication with an external communication apparatus via a communication line, comprising:

a communication line closing-and-connecting device that closes and connects a communication line capable of communicating an information with the external communication apparatus;

a line status identifier that identifies whether the communication line is closed and connected by the communication line closing-and-connecting device; and a common setting device provided on the surface of the housing, the common setting device including a common display, the common setting device used to set parameters of multiple functions, the multiple functions including at least a first function and a second function different from the first function, wherein the common setting device sets parameters of either the first function or the second function based on the operation of the common setting device in accordance with the identified result of the line status identifier.

2. The communication apparatus according to claim 1, wherein at least one of the first function and the second function includes one of reading concentration and reading resolution.

3. The communication apparatus according to claim 2, wherein one of the first function and the second function includes another function other than reading concentration and reading resolution.

4. The communication apparatus according to claim 3, the common display being used to display set parameters of at least one of reading concentration and reading resolution, and to display set parameters of the other function.

5. The communication apparatus according to claim 4, wherein the common display displays the set parameters of at least one of reading concentration and reading resolution, and the set parameters of the other function, according to a common layout.

6. The communication apparatus according to claim 5, further comprising: a receiver that receives information from a communication partner; and at least one of:

a ringing sound generator that generates a ringing sound when the receiver receives a call initiation, and a voice reproducer that reproduces a voice based on a voice of the communication partner received by the receiver, wherein the other function the parameters of which are set by the common setting device includes ringing volume of the ringing sound if the communication apparatus comprises the ringing sound generator, and the other function the parameters of which are set by the common setting device includes voice volume of the voice reproduced by the voice reproducer if the communication apparatus comprises the voice reproducer.

7. The communication apparatus according to claim 6, further including an image reader that reads image information of an original image, wherein the common setting device includes an original image detector that detects whether the original image is located at a read position where the original image can be read by the image reader, and the common setting device sets parameters of the at least one of the reading concentration and the reading resolution when the original image detector detects that the original image is located at the read position and the line status identifier identifies that the communication line is not closed and is not connected, and sets ringing volume of the ringing sound generator when the original image detector detects that the original image is not located at the read position and the line status identifier identifies that the communication line is not closed and is not connected.

8. The communication apparatus according to claim 6, further comprising the ringing sound generator and the voice reproducer, wherein the voice reproducer includes a handset that outputs a voice reproduced by the voice reproducer; and a handset detector that detects whether the handset is used, wherein when the handset detector detects that the handset is used and the line status identifier identifies that the line is closed and connected, the other function set by the common setting device includes voice volume of the voice reproduced by the voice reproducer.

9. The communication apparatus according to claim 8, further comprising a speaker that outputs the voice reproduced by the voice reproducer, wherein when the handset detector detects that the handset is not used, and the line status identifier identifies that the line is closed and connected, the other condition set by said common setting device includes at least one of ringing volume of the ringing sound generator, voice volume of the handset and speaker volume of the speaker.

10. The communication apparatus according to claim 1, further including an image reader that reads image information of an original image, wherein the common setting device includes an original image detector that detects whether the original image is located at a read position where the original image can be read by the image reader, and the setting device sets the at least one of the reading concentration and the reading resolution when the original image detector detects that the original image is located at the read position.

11. The communication apparatus according to claim 1, wherein the common setting device is used by a user.

12. A communication apparatus for performing communication with an external communication apparatus via a communication line, comprising:

a communication line closing-and-connecting device that closes and connects a communication line capable of communicating an information with the external communication apparatus;

a line status identifier that identifies whether the communication line is closed and connected by the communication line closing-and-connecting device;

an image reader that reads an image information of an original image;

an original image detector that detects whether the original image is located at a read position where the original image can be read by the image reader;

a handset that outputs a voice to the external communication apparatus;

a handset detector that detects whether the handset is used; and a common setting device which is used to set parameters of multiple functions, the multiple functions including at least a first function and a second function different from the first function, wherein the common setting device sets parameters of either the first function or the second function based on the operation of the common setting device in accordance with the identification of the line status identifier and at least one of the detection of the original image detector and the handset detector.

13. The communication apparatus according to claim 12, wherein at least one of the first function and the second function includes one of reading concentration and reading resolution.

14. The communication apparatus according to claim 13, wherein one of the first function and the second function includes another function other than reading concentration and reading resolution.

15. The communication apparatus according to claim 14, further comprising a common display which is used to display set parameters of at least one of reading concentration and reading resolution, and to display set parameters of the other function.

16. The communication apparatus according to claim 15, wherein the common display displays the set parameters of at least one of reading concentration and reading resolution, and the set parameters of the other function, according to a common layout.

* * * * *